United States Patent
Masciarelli, Jr.

(10) Patent No.: US 6,516,934 B2
(45) Date of Patent: *Feb. 11, 2003

(54) PNEUMATIC POP-UP UNITS FOR MATERIAL HANDLING EQUIPMENT

(76) Inventor: Camillo A. Masciarelli, Jr., 415 Berlin Dr., Marlborough, MA (US) 01752

( * ) Notice: Subject to any disclaimer, the term of this patent is extended or adjusted under 35 U.S.C. 154(b) by 89 days.

This patent is subject to a terminal disclaimer.

(21) Appl. No.: 09/735,321

(22) Filed: Dec. 11, 2000

(65) Prior Publication Data

US 2002/0059888 A1 May 23, 2002

Related U.S. Application Data

(63) Continuation-in-part of application No. 09/174,390, filed on Oct. 14, 1998, now Pat. No. 6,164,429.

(51) Int. Cl.$^7$ .............................................. B65G 13/00
(52) U.S. Cl. .............................. 193/35 SS; 193/35 MD
(58) Field of Search ..................... 193/35 MD, 35 SS

(56) References Cited

U.S. PATENT DOCUMENTS

| 2,671,242 | A | 3/1954 | Lewis |
| 4,108,455 | A | 8/1978 | James |
| 4,382,637 | A | 5/1983 | Blackburn et al. |
| 4,459,909 | A | 7/1984 | Takagi |
| 4,553,795 | A | 11/1985 | Takagi .................. 193/35 SS |
| 4,696,583 | A | * 9/1987 | Gorges .............. 193/35 MD X |
| 4,706,793 | A | 11/1987 | Masciarelli ........ 193/55 MD X |
| 4,732,490 | A | 3/1988 | Masciarelli ........ 193/35 MD X |
| 6,019,211 | A | 2/2000 | Masciarelli, Jr. ... 193/35 MD X |
| 6,164,429 | A | 12/2000 | Masciarelli, Jr. ... 193/35 MD X |

OTHER PUBLICATIONS

U.S.S.N. 09/649,289, inventor Masciarelli, Jr., filed Aug. 26, 2000.
U.S.S.N. 09/651,366, inventor Masciarelli, Jr., filed Aug. 30, 2000.

* cited by examiner

Primary Examiner—James R. Bidwell
(74) Attorney, Agent, or Firm—Kriegsman & Kriegsman

(57) ABSTRACT

Pneumatic pop-up unit for material handling equipment. In one embodiment, the unit comprises a stamped metal housing having a circumferential flange extending radially outwardly from the top. The unit also comprises a stamped metal cap comprising an outer side wall bent down across the outside edge of the flange and then radially inwardly against the bottom surface of the flange. The unit further comprises a two-piece stamped metal piston slidably mounted within the housing. The unit further comprises a stamped metal race disposed within the piston. A monolayer of ball bearings are arranged within the race. A primary ball is seated directly on top of the bearings. The top of the primary ball extends partially through the open top of the top piston piece. The unit further comprises a rubber seal fitted around the piston and a coiled spring for biasing the piston downwardly within the housing.

52 Claims, 21 Drawing Sheets

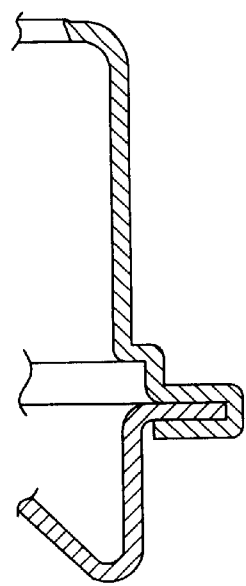
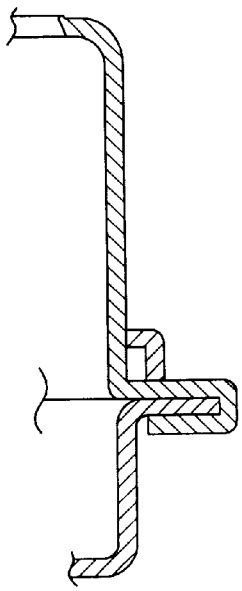
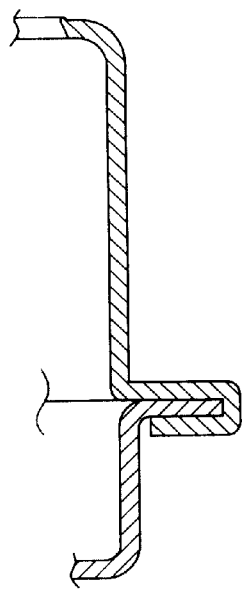
*FIG. 34(a)*   *FIG. 34(b)*   *FIG. 34(c)*
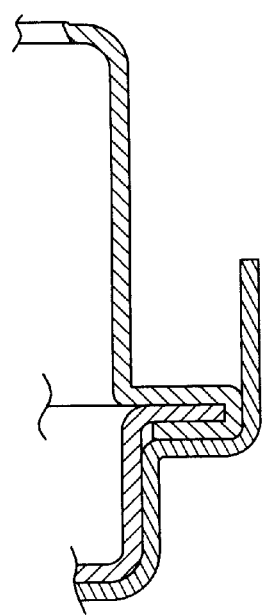
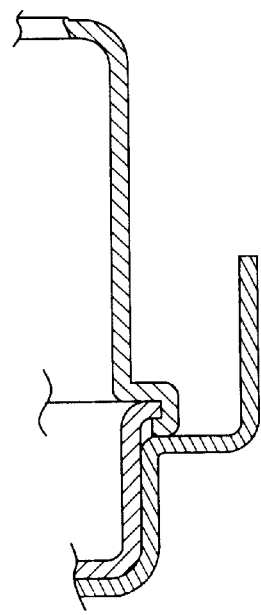
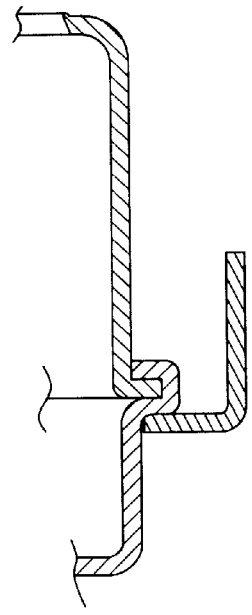
*FIG. 34(d)*   *FIG. 34(e)*   *FIG. 34(f)*

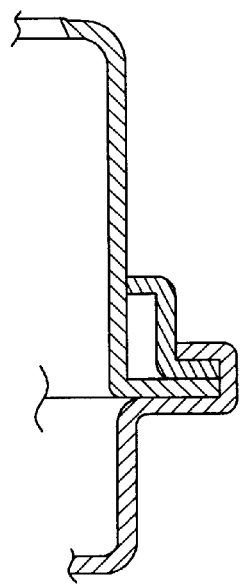
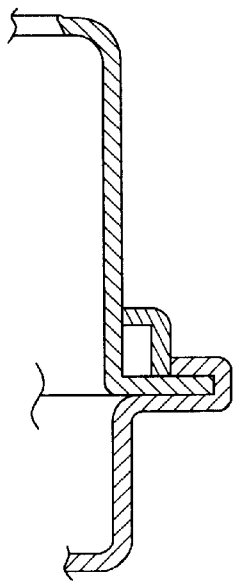
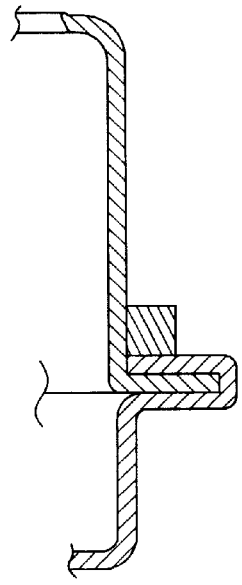
FIG. 34(g)　　　FIG. 34(h)　　　FIG. 34(i)
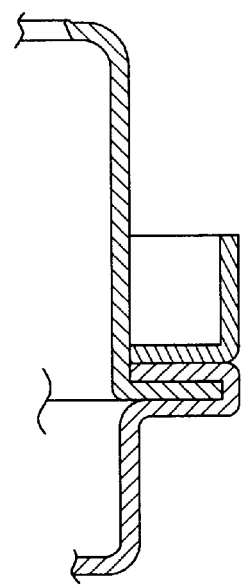
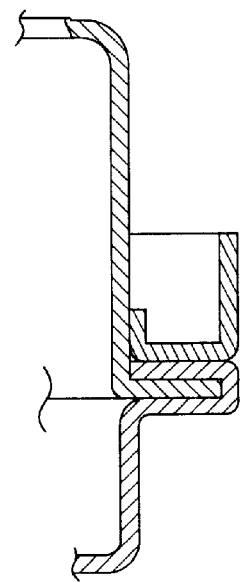
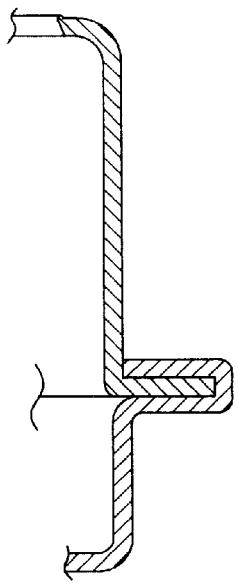
FIG. 34(j)　　　FIG. 34(k)　　　FIG. 34(l)

PNEUMATIC POP-UP UNITS FOR MATERIAL HANDLING EQUIPMENT

CROSS-REFERENCE TO RELATED APPLICATIONS

The present application is a continuation-in-part of U.S. patent application Ser. No. 09/174,390, U.S. Pat. No. 6,164,429, inventor Camillo Masciarelli, Jr., filed Oct. 14, 1998, the disclosure of which is incorporated herein by reference.

BACKGROUND OF THE INVENTION

The present invention relates generally to material handling equipment and relates more particularly to pneumatic pop-up units adapted for use in material handling equipment.

The manufacture and/or packaging of many types of commercial articles often involves the use of material handling equipment. One example of material handling equipment is a bench or workstation at which certain assembly or packaging steps for an article are performed. Another example of material handling equipment is a conveyor system for transporting an article from one workstation to another.

As can readily be appreciated, an article that is seated on top of a bench or workstation often must be re-positioned or rotated thereon so that certain assembly or packaging steps can be performed. Similarly, it is often the case that the direction in which an article is traveling along a conveyor system must be altered or its movement altogether stopped. For these reasons, various omni-directional devices and stopping devices have been devised that are adapted for use in material handling equipment.

For example, in U.S. Pat. No. 4,627,526, inventor Masciarelli, which issued Dec. 9, 1986, and which is incorporated herein by reference, there is disclosed a conveyor system which includes a number of driven rollers mounted in a spaced, parallel relationship. A conveyor element is located between adjacent driven rollers, the conveyor element consisting of a main body having a series of passages in which plungers are slidably carried. An inflatable bladder moves each of the plungers from a retracted position to an operative position. More specifically, each passage is a bore in the main body, and each plunger consists of a sphere rotatably carried in a sheath whose outer surface is formed to slide smoothly in the bore. In this manner, when the bladder is inflated, the spheres are moved from their retracted positions to their operative positions, where they engage the article and lift the article above the top level of the driven rollers, thereby enabling the article to be re-positioned relative to the rollers (or pushed off of the driven rollers, for example, onto a lateral conveyor). When the bladder is then deflated, the spheres retract and an article situated thereon is lowered back onto the driven rollers. Alternatively, instead of including a sphere, the plunger may include a stop pin for use in stopping the movement of the article across the series of driven rollers.

As another example of an omni-directional device adapted for material handling equipment, in U.S. Pat. No. 4,660,994, inventor Masciarelli, which issued Apr. 28, 1987, and which is incorporated herein by reference, there is disclosed an anti-friction (i.e., omni-directional) assembly adapted for use in material handling equipment. More specifically, the aforementioned assembly comprises a main body having a first bore entering one surface and a second bore concentric with but non-coextensive with the first bore. A piston is slidable in the second bore and has a stem whose free end is slidable in the first bore. The stem carries a ball which is rotatable on a nest of secondary balls in a cavity in the free end of the stem. The piston and the stem are movable from a first position in which the ball lies substantially within the first bore below a friction element (e.g., the workstation, driven rollers, etc.) to a second position in which the ball protrudes from the first bore above the friction element. Means are provided for introducing fluid under pressure to the second bore to move the piston and to carry the ball from the first position to the second position. In addition, means are provided in the second bore to bias the piston to normally maintain the piston and the ball in the first position.

As still another such example., in U.S. Pat. No. 6,019,211, inventor Masciarelli, Jr., which issued Feb. 1, 2000, and which is incorporated herein by reference, there is disclosed a conveyor having a plurality of spaced rollers mounted between a pair of elongated horizontal frame members for supporting an article and enabling the article to be conveyed longitudinally of the frame members. The conveyor has a workstation formed by a plurality of interrupter strips extending in the spaces between rollers. Each interrupter strip has a plurality of lifting pads which are selectively movable between a lower position in which the upper surface of the pads are below the tops of the rollers and an upper position in which the upper surface of the pads are above the tops of the rollers for supporting the article and frictionally engaging the article to maintain the article in a stable position above the strips. The interrupter strips also have a plurality of balls mounted for omnidirectional rotation on the interrupter strips. Each ball is selectively movable between a lower position in which the top of the ball is below the top of the rollers and an upper position in which the top of the ball is above the top of the rollers. The balls are selectively moved independently of the lifting pads so that the article can be supported solely by the balls or by the lifting pads.

Referring now to FIGS. 1 through 4, there are shown various views of still yet another example of a conventional pneumatic pop-up unit, said unit being of the omni-directional variety and being represented generally by reference numeral 11. Unit 11 comprises a housing 13, housing 13 being a generally cylindrical, cup-shaped member having a circular side wall 15, a bottom wall 17 and an open top. A nipple 19 is mounted in bottom wall 17, nipple 19 being adapted for connection to a pressurized gas (or other fluid) supply. Housing 13 is typically made of machined metal (e.g., aluminum, steel).

Unit 11 also comprises a cap 21, cap 21 also being made of machined metal (e.g., aluminum, steel). Cap 21 comprises a top wall 23 and a side wall 25. Top wall 23 is flat and annular in shape. Side wall 25, which extends downwardly from the inside diameter of top wall 23, is circular in cross-section. Side wall 25 is dimensioned to fit closely inside side wall 15 of housing 13, with top wall 23 extending radially outwardly across side wall 15 and defining a circumferential flange 27 used to mount unit 11 in a hole H formed in a workbench W or the like. A pair of spaced apart circumferential lips 29 and 31 are formed on the outside surface of side wall 25 of cap 21, lips 29 and 31 defining a groove 33 therebetween. The outside surface of side wall 25 tapers slightly inwardly in diameter from lip 31 to the bottom surface thereof. Housing 13 and cap 21 are secured to one another by staking (i.e., mechanically deforming) housing 13 into groove 33 at approximately four points 34 equidistantly spaced around the circumference of housing 13.

Unit 11 further comprises a piston 41, piston 41 being slidably mounted within housing 13. Piston 41, which is made by stamping and rolling a suitable sheet of metal, is a generally cylindrical, hollow member and includes a bottom wall 43, a circular side wall 45 and an open top. A ring 47 is fixedly secured by a press-fit to the outside surface of side wall 45, ring 47 being disposed a short distance from bottom wall 43. The top surface of ring 47 is used to engage the bottom end of a spring 49, the top end of spring 49 being engaged by lip 31 of cap 21. Spring 49 serves to bias piston 41 downwardly towards bottom wall 17 of housing 13. A rubber seal 51 is snugly fitted around side wall 45 of piston 41 and is engaged at its top surface by the bottom surface of ring 47 in such a way that ring 47 keeps seal 51 from sliding up on piston 41. Seal 51 serves to create an air-tight chamber between the bottom end of piston 41 and housing 13, seal 51 typically being of the split design variety (e.g., U-cup, block-V) so that, when seal 51 is subjected to upward fluid pressure, its outer leg is urged against the inside surface of wall 15 of housing 13 and its inner leg is urged against the outside surface of wall 45 of piston 41.

Unit 11 further comprises a bowl-shaped race 55, race 55 being disposed inside of piston 41. Race 55 is seated on top of a race support 57, race support 57 being seated directly on top of the inside surface of wall 43 of piston 41. Race 55, which is made by stamping, has an outer diameter slightly smaller than the inner diameter of piston 41 and is adapted to hold a plurality of ball bearings 59. Race support 57 is shaped to include a circular side wall 61, on which race 55 is seated, and an annular bottom wall 63, which extends radially outwardly from side wall 61 to slightly less than the inner diameter of piston 41. A primary ball 65 is seated on ball bearings 59 and extends partially through the open top of piston 41, the top of side wall 45 being, rolled around ball 65 to retain ball 65 within piston 41. Ball 65 is aligned with the central opening in cap 21 and is appropriately sized relative thereto to partially extend therethrough.

Although unit 11 has been found to be generally satisfactory for its intended purpose, the present inventor has observed the following shortcomings in connection therewith: First, as noted above, housing 13 and cap 21 are made by metal machining processes (either by screw machining or by powdered metal technology). Unfortunately, however, these metal machining processes often result in tolerances that are greater than optimally desired to enable housing 13 and cap 21 to fit together properly on a consistent basis when both are mass-produced. In addition, the aforementioned machining processes can be time-intensive and labor-intensive and, therefore, costly.

Second, as explained above, housing 13 and cap 21 are secured to one another by staking housing 13 into groove 33 of cap 21 at four equally spaced points 34 around the perimeter of housing 13. Unfortunately, however, said staking technique is, on occasion, not secure enough for cap 21 and housing 13 to withstand becoming separated by the force of the pressurized gas admitted into housing 13 to raise piston 41 therewithin and/or by the force of articles dropped or loaded on top of unit 11 during routine material handling steps.

Third, once cap 21 has been staked to housing 13 in the above-described manner, cap 21 cannot be removed from housing 13 and thereafter re-attached without causing damage to cap 21 and/or to housing 13 (see, for example, breaks 36 in lip 31 of cap 21, as shown in FIG. 4). This is unfortunate since the internal components of a unit can become worn and/or dirty over time. Consequently, at present, the only viable option is to replace the entire unit.

Fourth, as described above, the upper end of spring 49 wraps around side wall 25 of cap 21 and is abutted at its top surface by lower lip 31. Consequently, when piston 41 is elevated to its uppermost position within housing 13, spring 49 becomes completely compressed—an undesirable condition since it may result in spring 49 weakening or locking in its compressed state. Moreover, because the outside surface of side wall 25 tapers inwardly from lip 31 to the bottom of side wall 25, the diameter of the wire used to make spring 49 must be small enough to allow spring 49 at its top end to fit between the rather small space left between side wall 25 of cap 21 and housing 13. Typically, this amounts to a wire diameter of about seventy-thousandths of an inch for spring 49.

Fifth, the manner in which piston 41 is finished, with race 55, race support 57, bearings 59 and ball 65 all arranged therewithin is as follows: First, piston 41 is stamped into the shape of a hollow cylindrical can having an open top. Race support 57, race 55, bearings 59 and ball 65 are then positioned within piston 41 in the manner described above. Finally, the top edges of side wall 45 of piston 41 are rolled or coined inwardly around ball 65 so as to entrap ball 65 and the other contents of piston 41 therewithin. Unfortunately, the metal used to form piston 41 has a tendency to "spring-back" to its original shape after having been stamped or rolled/coined; consequently, it is necessary to "overbend" the metal to compensate for anticipated spring-back. Such overbending, however, can create its own problems. For example, the overbending of the top edges of piston 41 around ball 65 can create nicks or cuts in ball 65 or can otherwise damage ball 65, particularly if ball 65 is made of a soft material, such as a soft plastic. In addition, the overbending of the top edges of piston 41 against ball 65 results in a considerable force being applied by race support 57 to the bottom of piston 41, thereby occasionally resulting in the bottom of piston 41 becoming deformed (i.e., spreading radially outwardly and/or buckling downwardly towards the middle). Furthermore, the overbending of the top edges of piston 41 against ball 65 can cause bearings 59 to be driven into and to deform race 55.

SUMMARY OF THE INVENTION

It is an object of the present invention to provide a novel pneumatic pop-up unit adapted for use in material handling equipment.

It is another object of the present invention to provide a pneumatic pop-unit as described above that overcomes at least some of the disadvantages associated with existing pneumatic pop-up units.

It is still another object of the present invention to provide a pneumatic pop-up unit that can be mass-produced readily and relatively inexpensively.

Additional objects, features, aspects and advantages of the present invention will be set forth, in part, in the description which follows and, in part, will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts:

FIGS. 34(a) through 34(l) are fragmentary section views of various alternative multi-piece pistons adapted for use in the pneumatic pop-unit of the present invention.

DETAILED DESCRIPTION OF PREFERRED EMBODIMENTS

Figure 1:
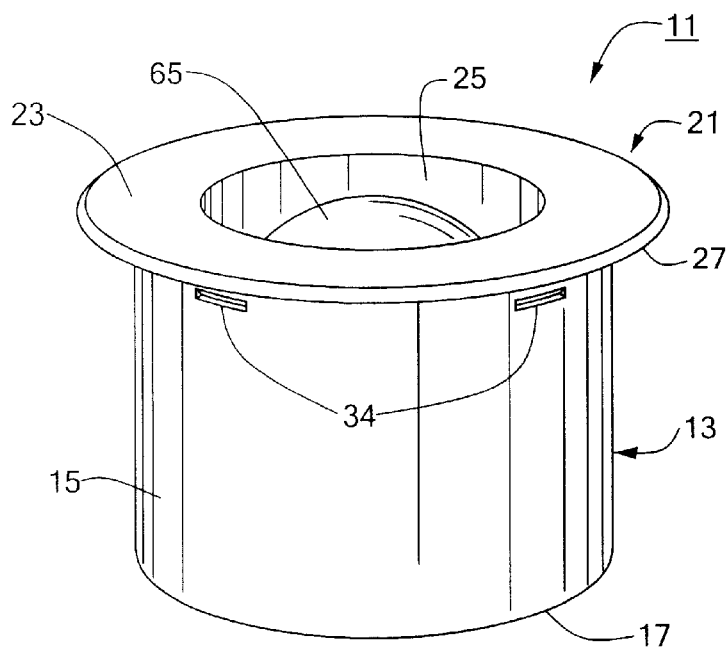
FIG. 1 is a top perspective view of a conventional pneumatic pop-up unit of the omni-directional variety, said pneumatic pop-up unit being shown with its piston in the retracted position.
Figure 2:
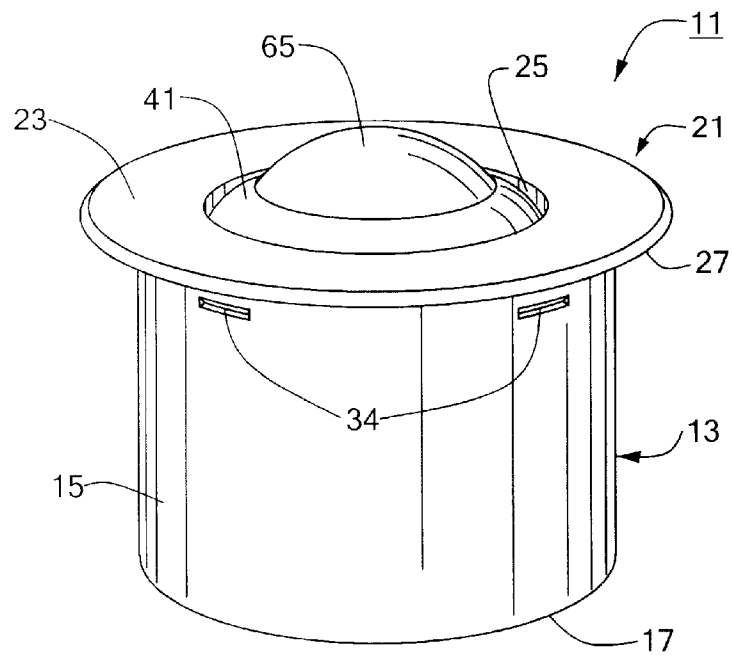
FIG. 2 is a top perspective view of the conventional pneumatic pop-up unit of FIG. 1, said pneumatic pop-up unit being shown with its piston in a substantially extended position.
Figure 3:
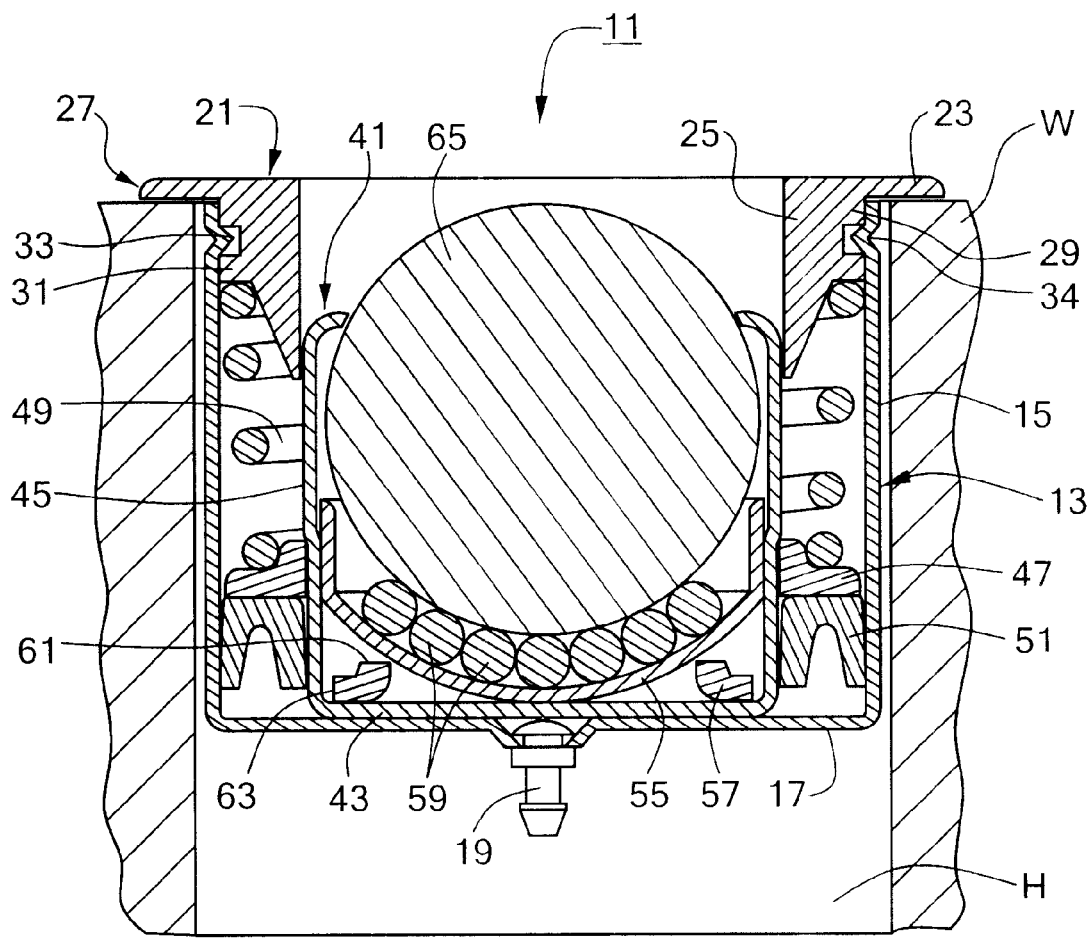
FIG. 3 is a section view of the conventional pneumatic pop-up unit of FIG. 1, said pneumatic pop-up unit being shown mounted in a hole in a workbench.
Figure 4:
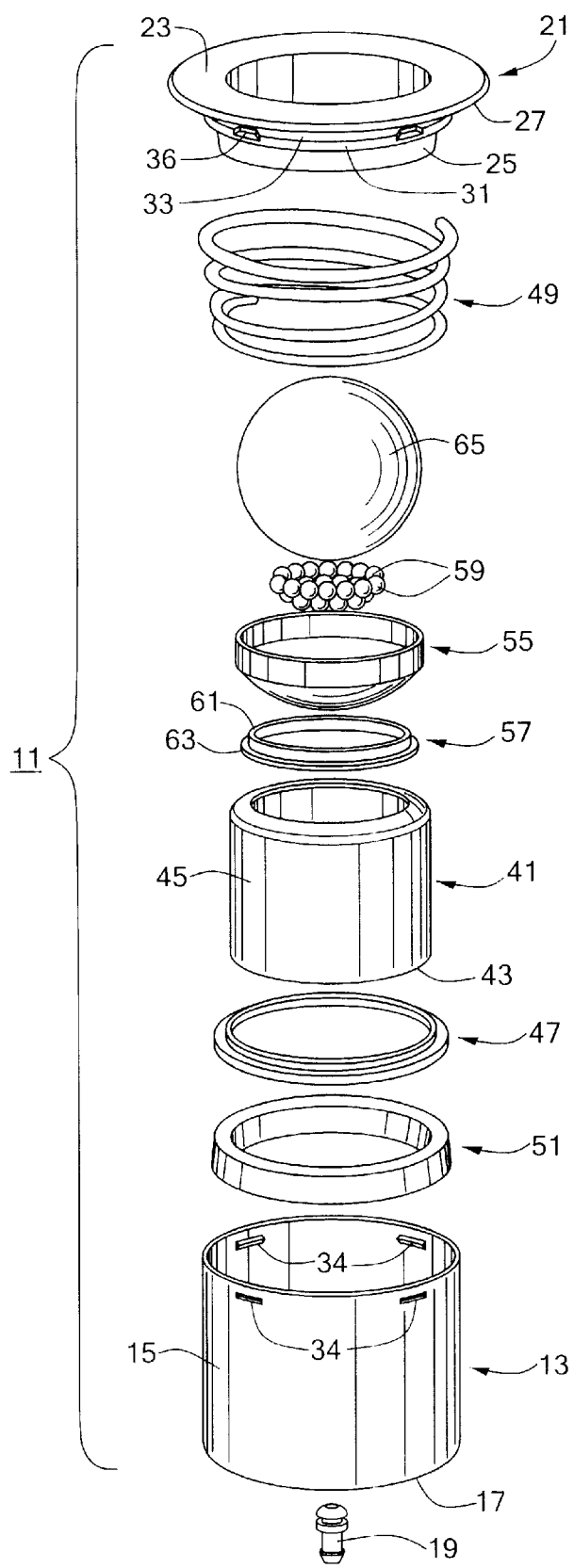
FIG. 4 is a post-assembly, exploded perspective view of the conventional pneumatic pop-up unit of FIG. 1.
Figure 5:
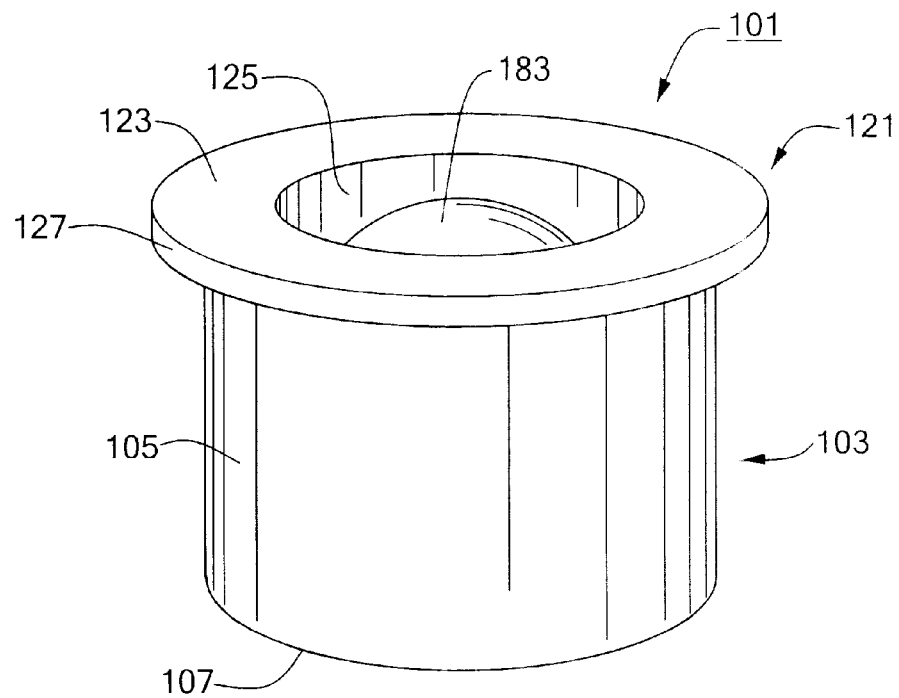
FIG. 5 is a top perspective view of a first embodiment of a pneumatic pop-up unit constructed according to the teachings of the present invention, said pneumatic pop-up unit being shown with its piston in the retracted position.
Figure 6:
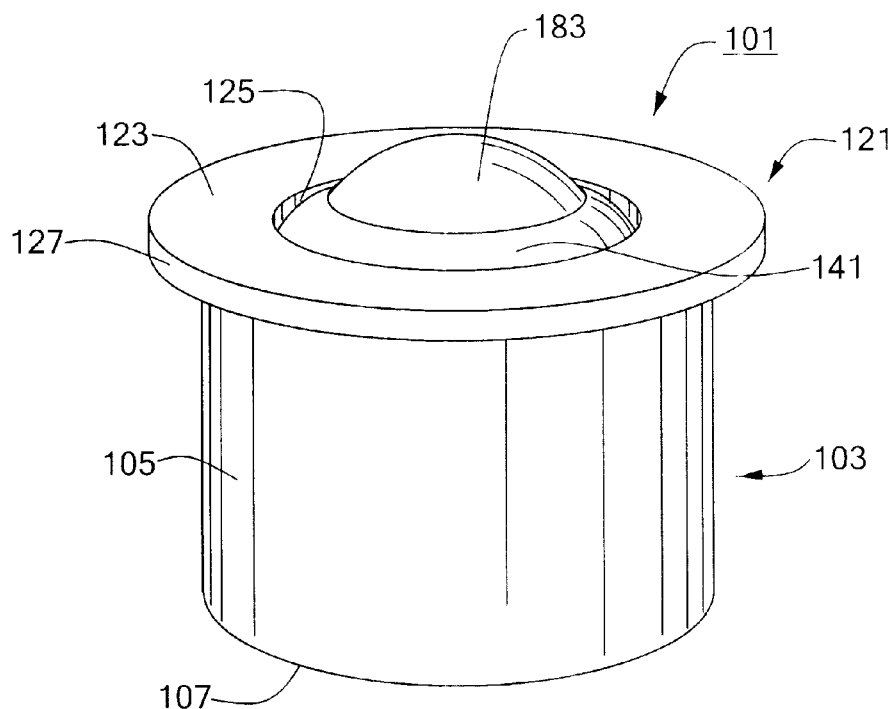
FIG. 6 is a top perspective view of the pneumatic pop-up unit of FIG. 5, said pneumatic pop-up unit being shown with its piston in a substantially extended position.

Referring now to FIGS. 5 through 8, there are shown various views of a first embodiment of a pneumatic pop-up unit constructed according to the teachings of the present invention, said pneumatic pop-up unit being represented generally by reference numeral 101.

Figure 7:
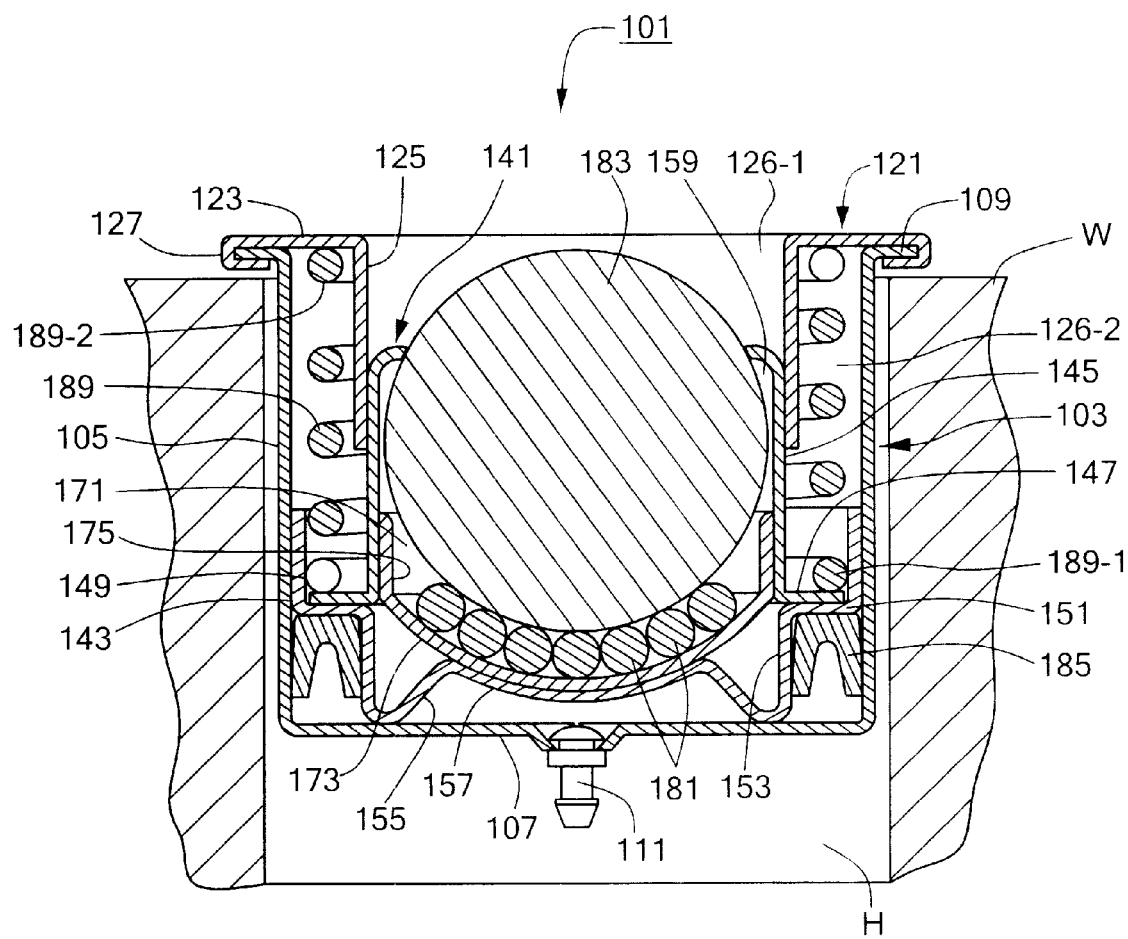
FIG. 7 is a section view of the pneumatic pop-unit of FIG. 5, said pneumatic pop-up unit being shown mounted in a hole in a workbench.
Figure 8:
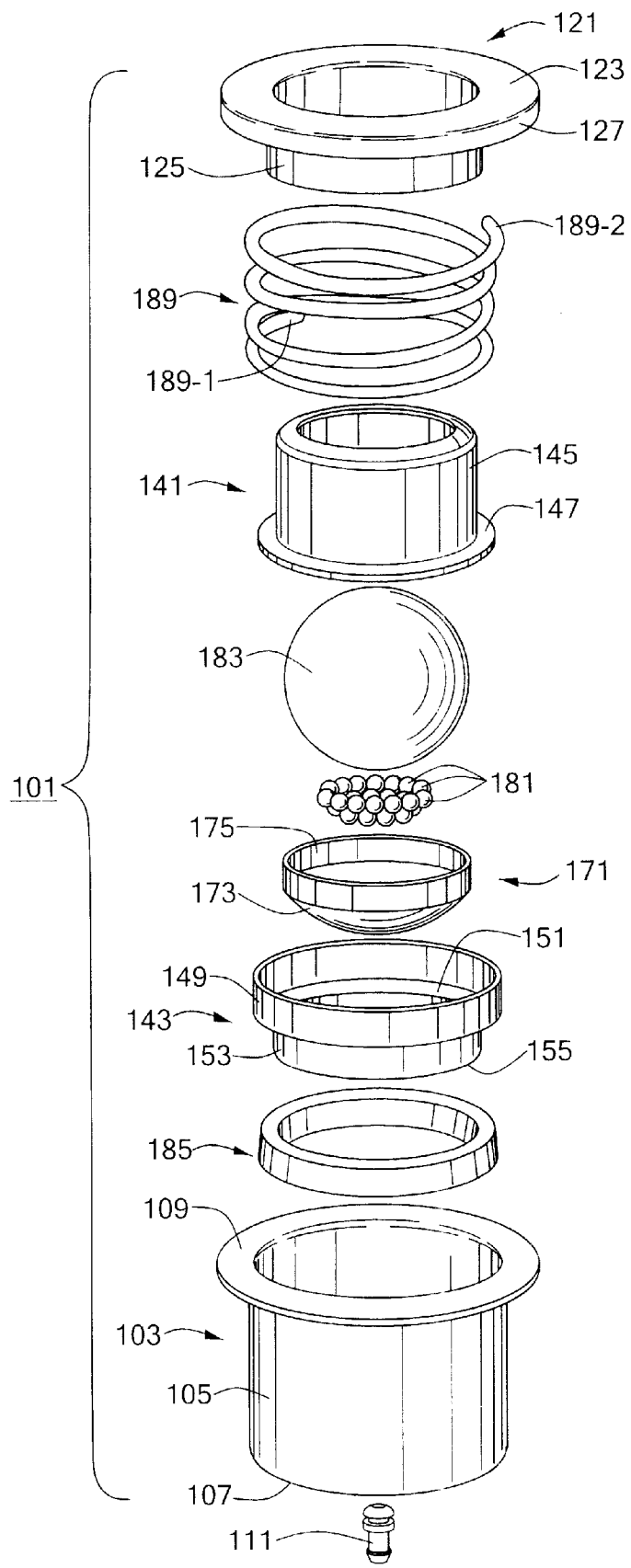
FIG. 8 is a post-assembly, exploded perspective view of the pneumatic pop-up unit of FIG. 5.
Figure 9E:
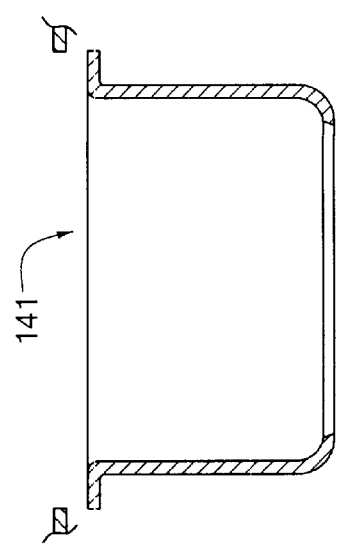
FIGS. 9(a) through 9(e) are views showing the manner in which the top piece of the piston is manufactured.
Figure 9C:
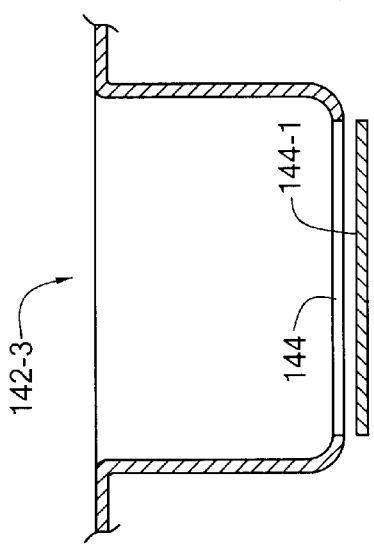
Figure 9D:
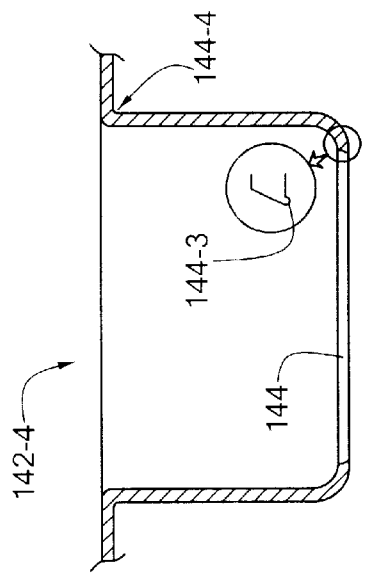
Figure 9A:
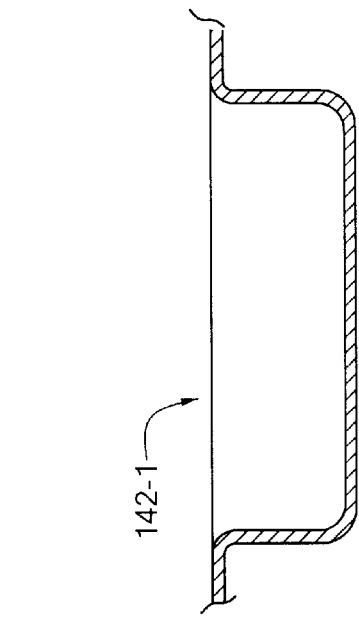
Figure 9B:
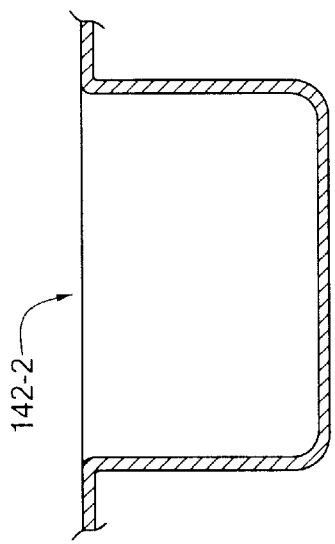

As seen best in FIGS. 7 and 8, unit 101 comprises a housing 103. Housing 103 is a generally cylindrical, cup-shaped member having a circular side wall 105, a bottom wall 107, a circumferential flange 109 extending radially outwardly from the top of side wall 105, and an open top. A nipple 111 is mounted in bottom wall 107, nipple 111 being adapted for connection to a pressurized gas (or other fluid) supply. (Although shown centered in bottom wall 107, nipple 111 may be positioned off-center in bottom wall 107.) Housing 103 is preferably made of stamped metal.

Unit 101 also comprises a cap 121, cap 121 preferably being made of stamped metal. Cap 121 comprises a top wall 123, top wall 123 being flat and annular in shape. Cap 121 also comprises an inner side wall 125, inner side wall 125 being circular in cross-section and extending downwardly from the inside diameter of top wall 123. Inner side wall 125, whose outer diameter is somewhat smaller than the inner diameter of housing 103, partially subdivides housing 103 into inner and outer concentric chambers 126-1 and 126-2, respectively, with top wall 123 extending radially outwardly over the top surfaces of side wall 105 and flange 109. Cap 121 further comprises an outer side wall 127, outer side wall 127 being bent so as extend downwardly from the outside diameter of top wall 123 across the outside edge of flange 109 and then radially inwardly towards side wall 105 while pressed against the bottom surface of flange 109.

When cap 121 is manufactured, outer side wall 127 is preferably not bent; in fact, it preferably extends straight down from top wall 123. However, after cap 121 and housing 103 have been brought together, side wall 127 is bent circumferentially around flange 109 in the above manner so as to secure cap 121 to housing 103. As can readily be appreciated, because cap 121 is secured to flange 109 around their respective peripheries, cap 121 and housing 103 are able to withstand much greater separation forces than cap 21 and housing 13 of unit 11. In addition, because of the aforementioned manner in which cap 121 and housing 103 are joined to one another, there is no need to stake or otherwise deform side wall 105 of housing 103 into chambers 126-1 and 126-2 of housing 103, thereby making available more room within housing 103 for the various components to be described below.

Unit 101 further comprises a piston slidably mounted within housing 103, said piston comprising a top piece 141 and a bottom piece 143. Top piece 141 is a generally cylindrical, hollow member and includes a circular side wall 145, a peripheral flange 147 extending radially outwardly from the bottom of side wall 145, an open bottom and an open top. Side wall 145 is curled or coined inwardly at its top end for reasons to become apparent below. Peripheral flange 147 is adapted, among other things, to abut the bottom surface of inner side wall 125 of cap 121 so that said bottom surface of inner side wall 125 serves as a stop to delimit upward movement of the piston within housing 103.

Bottom piece 143 is shaped to include an open top, a circular upper side wall 149, an annular shelf 151 extending radially inwardly a short distance from the bottom of side wall 149, a circular lower side wall 153 extending downwardly a short distance from the inner diameter of shelf 151, and a bottom wall 155 that extends upwardly and radially inwardly from the bottom of side wall 153 for a short distance and then forms an upwardly facing bowl-shaped central portion 157.

Peripheral flange 147 of top piece 141 has substantially the same inner and outer diameters as shelf 151 of bottom piece 143 and is seated directly thereupon. Top piece 141 and bottom piece 143 jointly define a piston chamber 159 having an open top.

Each of top piece 141 and bottom piece 143 is preferably made of stamped metal. Referring now to FIGS. 9(*a*) through 9(*e*), there is shown a series of drawings illustrating the manner in which top piece 141 may be formed from a flat sheet of metal. The present method is preferably performed using a progressive die having a plurality of stations, with the top piston pieces-in-progress being carried on a common skeleton. At the first station, a round blank needed for processing at later stations is punched. Next, the round blank is stamped to form the trough-shaped member 142-1 shown in FIG. 9(*a*). Next, member 142-1 is stamped again to form the member 142-2 of FIG. 9(*b*), member 142-2 having the proper depth and diameter of top piece 141 and also having a reduced radius at its bottom and top. Next, a disc-shaped piece 144-1 of material is punched out of the bottom of member 142-2 to yield member 142-3, member 142-3 being shown in FIG. 9(*c*). (Member 142-3 has a hole 144 that will later serve as the open top of top piece 141.) Next, the edges of the wall that define hole 144 are finished as in member 142-4 of FIG. 9(*d*) so that they define a hole of a particular diameter and so that they are smooth and include a bump 144-3 that deflects material away from hole 144. (This finishing step is optional and may be omitted.) A square corner 144-4 is also preferably formed on the outside radius of the peripheral flange at this time. Lastly, the finished piston piece 141 is detached from the skeleton as shown in FIG. 9(*e*).

As can readily be appreciated, because top piece 141 is formed in the manner described above, it is not necessary to bend top piece 141 around the ball and encounter the problems of overbending discussed above in connection with the prior art.

Referring back now to FIGS. 7 and 8, unit 101 can be seen to further comprise a race 171 disposed within piston chamber 159. Race 171, which is preferably made of stamped metal, is shaped to include an upwardly facing bowl-shaped bottom wall 173 and a circular side wall 175 extending upwardly from the outer periphery of bottom wall 173. Bottom wall 173 conforms to the shape of and sits on top of central portion 157 of bottom piece 143. Side wall 175 is loosely secured to the inner surface of side wall 145 of top piece 141 by a slip-fit.

Unit 101 additionally comprises a plurality of ball bearings 181 and a primary ball 183. Bearings 181 are dispersed in a monolayer on bottom wall 173 of race 171. Primary ball 183 is disposed directly on top of bearings 181 and is freely rotatable thereon. The top of primary ball 183 extends partially through the open top of top piece 141 and is retained within piston chamber 159 by the inwardly curled top edge of wall 145.

As can readily be appreciated, because bottom wall 155 of bottom piece 143 conforms to the shape of race 171 and provides support to race 171 against loads placed on ball 183, the thickness and strength of race 171 can be less than they would otherwise have to be. In addition, the shape of bottom wall 155 reduces the possibility that bottom wall 155 will buckle downwardly when heavy loads are placed on ball 183.

Unit 101 further comprises a rubber seal 185, seal 185 being snugly fitted around side wall 153 of bottom piece 143 and engaged at its top surface by shell 151 of bottom piece 143 so as to keep seal 185 from sliding up on bottom piece 143. Seal 185 serves to create an air-tight chamber between the bottom end of the piston and housing 103, seal 185 preferably being of the split design variety (e.g., U-cup, block-V) so that, when seal 185 is subjected to upward gas pressure, its outer leg is urged against the inside surface of wall 105 of housing 103 and its inner leg is urged against the outside surface of wall 153 of the piston. Although less preferred, seal 185 may be an O-ring or the like.

Unit 101 additionally comprises a coiled spring 189 for biasing the piston downwardly within housing 103. The bottom end 189-1 of spring 189 is seated on top of flange 147, with the outer diameter of bottom end 189-1 frictionally engaging the inside surface of wall 149. The top end 189-2 of spring 189 abuts the bottom surface of top wall 123 of cap 121. As can readily be appreciated, one advantage of unit 101, as compared to unit 11, is that spring 189 is less compressed than spring 49 when the respective units are in their retracted positions. This is because top end 189-2 of spring 189 abuts top wall 123 of cap 121 whereas the top end of spring 49 does not extend as far upwardly and, instead, abuts lip 31 of cap 21. In addition, because of the relative shapes of cap 121 and cap 21, the diameter of the wire used in spring 189 can be as much as 30% greater than the diameter of the wire used in spring 49. Such an increase in wire diameter is highly desirable because it gives spring 189 much greater retraction strength than spring 49.

It should be understood that, even though, in the present embodiment, spring 189 has a straight shape (i.e., constant overall diameter of coils throughout spring 189), spring 189 could be replaced with a spring having a conical shape (i.e., smaller overall diameter at top end 189-2 of spring 189 and larger overall diameter at bottom end 189-1 of spring 189). It should be noted, however, that a straight spring is typically less expensive than a conical spring.

One possible method for assembling unit 101 is as follows: First, bearings 181 are positioned within race 171, and ball 183 is positioned on top of bearings 181. The combination of bearings 181, ball 183 and race 171 is then pushed up into place within top piece 141 through its open bottom. Seal 185 is attached to bottom piece 143, and top piece 141 and bottom piece 143 are brought together. Bottom end 189-1 of spring 189 is positioned on top of flange 147 and frictionally engages the inner surface of side wall 129. The foregoing combination is then placed inside of housing 103. Cap 121 is then used to cover housing 103, with top end 189-2 of spring 189 abutting the bottom surface of top wall 123 and frictionally engaging the outer surface of side wall 125. Outer side wall 127 is then rolled or crimped around flange 109.

Unit 101 is operated in the conventional manner. One additional advantage of unit 101 is that the collar defined by side wall 149, flange 147 and side wall 145 is adapted to collect debris that may enter unit 101 through the open top end of housing 103 and may otherwise impair the functioning of unit 101.

Although unit 101 is constructed so that ball 183 is positioned partially above top wall 123 of cap 121 when the piston is in its fully extended position and is positioned completely below top wall 123 of cap 121 when the piston is in its fully retracted position, it can readily be understood that unit 101 could be modified so that, when the piston is in its fully retracted position, ball 183 extends partially above top wall 123, albeit to a lesser extent than when said piston is in a fully extended position.

Although the various components of unit 101 are described above as preferably being made of metal, many of said components, except perhaps for bearings 181, ball 183, race 171, spring 189, and cap 121 (because of the malleability requirements of side wall 127), may be made of molded plastic.

Figure 10:
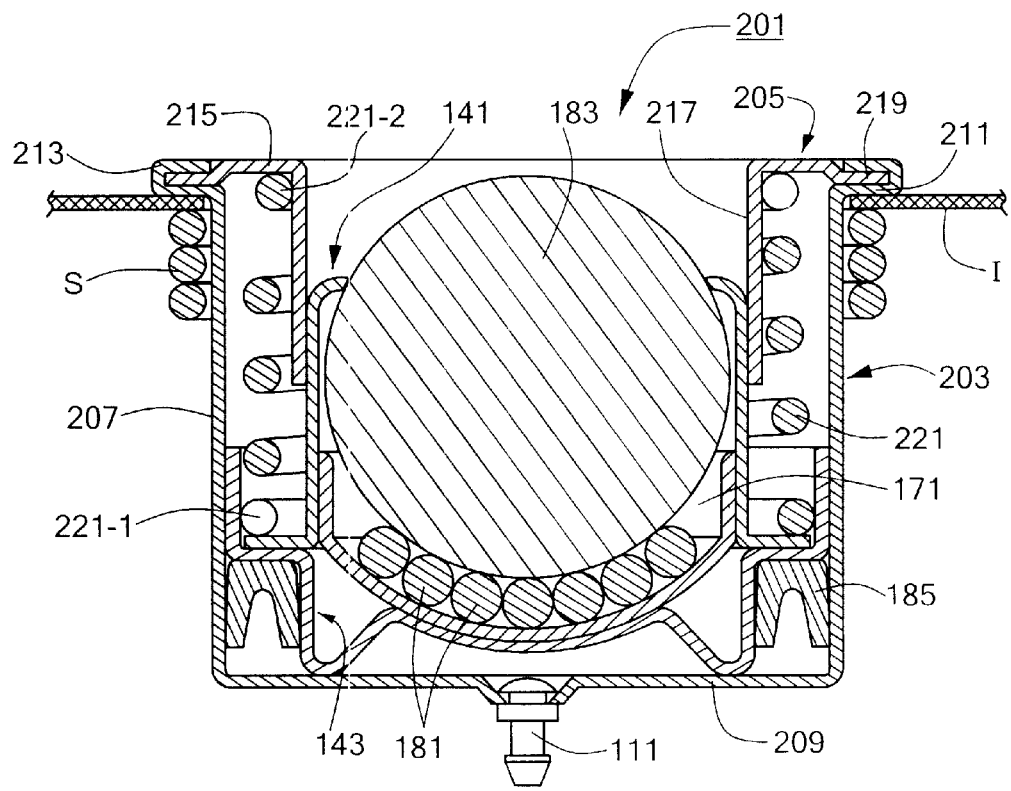
FIG. 10 is a section view of a second embodiment of a pneumatic pop-up unit constructed according to the teachings of the present invention, said pneumatic pop-up unit being shown mounted in an interrupter strip of a conveyor system, the piston of the pneumatic pop-up unit being shown in the retracted position.

Referring now to FIG. 10, there is shown a section view of a second embodiment of a pneumatic pop-up unit constructed according to the teachings of the present invention, said pneumatic pop-up unit being shown represented generally by reference numeral 201.

Unit 201, which is mounted in a hole provided in a conveyor system interrupter strip I and secured in place with a retaining spring S, is similar in many respects to unit 101, one difference between the two units being that housing 203 and cap 205 of unit 201 are shaped and fitted together differently than are housing 103 and cap 121 of unit 101. More specifically, housing 203 is a generally cylindrical, cup-shaped member having an inner side wall 207, a bottom wall 209, a circumferential flange 211 extending radially outwardly from the top of side wall 207, an outer side wall 213 extending from the outer diameter of flange 211, and an open top. Cap 205, in turn, is shaped to include an annular top wall 215, an inner side wall 217 extending downwardly from the inside diameter of top wall 215, and a vertically offset annulus 219. Annulus 219 is appropriately dimensioned so as to be seated on top of flange 211, with outer side wall 213 being bent around and over the top of annulus 219 in order to securely attach cap 205 to housing 203.

Each of housing 203 and cap 205 is preferably made of stamped metal.

Unit 201 also differs from unit 101 in that unit 201 includes a conical spring 221 having a bottom end 221-1 and a top end 221-2. Top end 221-2 abuts the bottom surface of top wall 123 of cap 121, with the inner diameter of top end 221-2 frictionally engaging the outer surface of wall 125 of cap 121.

Figure 11:
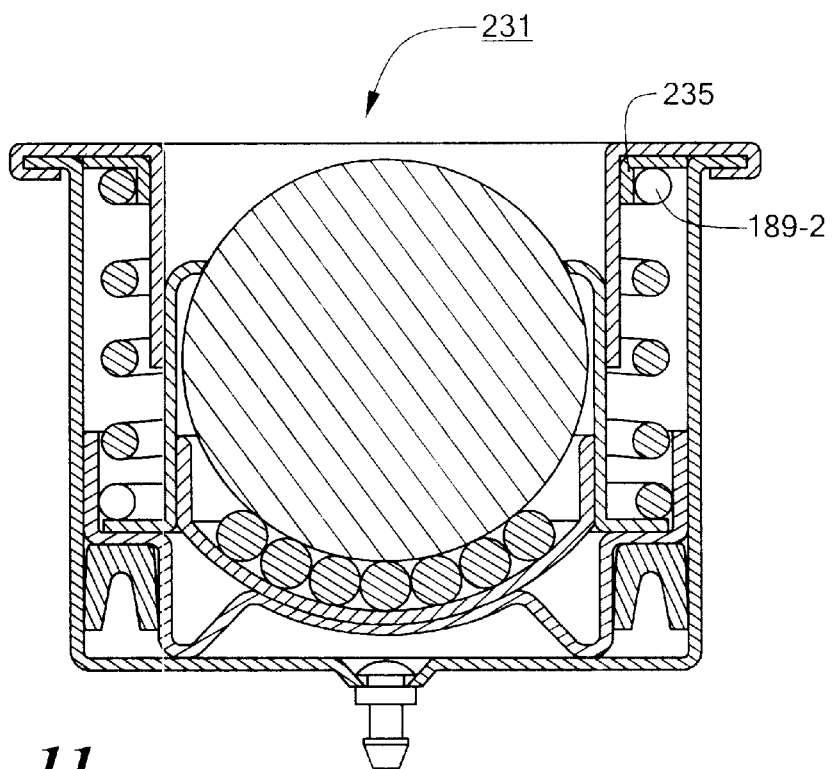
FIG. 11 is a section view of a third embodiment of a pneumatic pop-up unit constructed according to the teachings of the present invention, said pneumatic pop-up unit being shown with its piston in the retracted position.

Referring now to FIG. 11, there is shown a section view of a third embodiment of a pneumatic pop-up unit constructed according to the teachings of the present invention, said pneumatic pop-up unit being shown represented generally by reference numeral 231.

Unit 231 is similar in many respects to unit 101, the principal differences between the two units being that unit 231 further includes an annularly-shaped spring retainer 235. Retainer 235, which is held in place by the inner diameter of spring 189, helps to keep the top end 189-2 of spring. 189 centered and aligned with the remainder of spring 189. One advantage of unit 231 over unit 101 is that retainer 235 provides structural support to cap 121, thereby enabling cap 121 to be made thinner, if desired.

Retainer 235 is preferably made of stamped metal.

Figure 12:
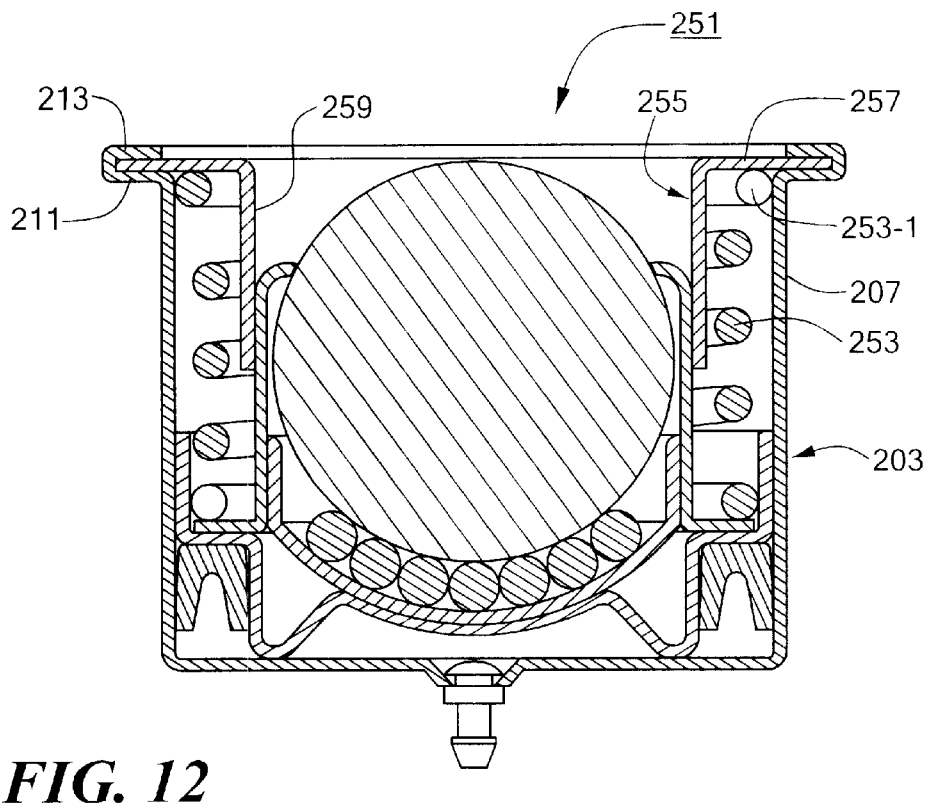
FIG. 12 is a section view of a fourth embodiment of a pneumatic pop-up unit constructed according to the teachings of the present invention, said pneumatic pop-up unit being shown with its piston in the retracted position.

Referring now to FIG. 12, there is shown a section view of a fourth embodiment of a pneumatic pop-up unit constructed according to the teachings of the present invention, said pneumatic pop-up unit being shown represented generally by reference numeral 251.

Unit 251 is similar in many respects to unit 201, one of the principal differences between the two units being that unit 251 includes a spring 253 whose upper and lower coils have a larger diameter than its intermediate coils, as opposed to being conical in shape. In fact, the top end 253-1 of spring 253 is sized to frictionally engage the inner surface of wall 207 of housing 203. Another principal difference between unit 251 and unit 201 is that unit 251 includes a cap 255. Cap 255, which is preferably made of stamped metal, is shaped to include a flat annular top wall 257 and a circular side wall 259, side wall 259 extending downwardly from the inner diameter of wall 257. The outer end of top wall 257 is appropriately dimensioned so as to be seated on top of flange 211, with outer side wall 213 being bent around and over the top of top wall 257 in order to securely attach cap 255 to housing 203. One advantage of unit 251, as compared to unit 201, is that top end 253-1 of spring 253 reacts against that portion of cap 255 just inside of flange 211 and helps to inhibit downward deflection of cap 255 thereat, thereby enabling cap 255 to be made of thinner material.

Figure 13:
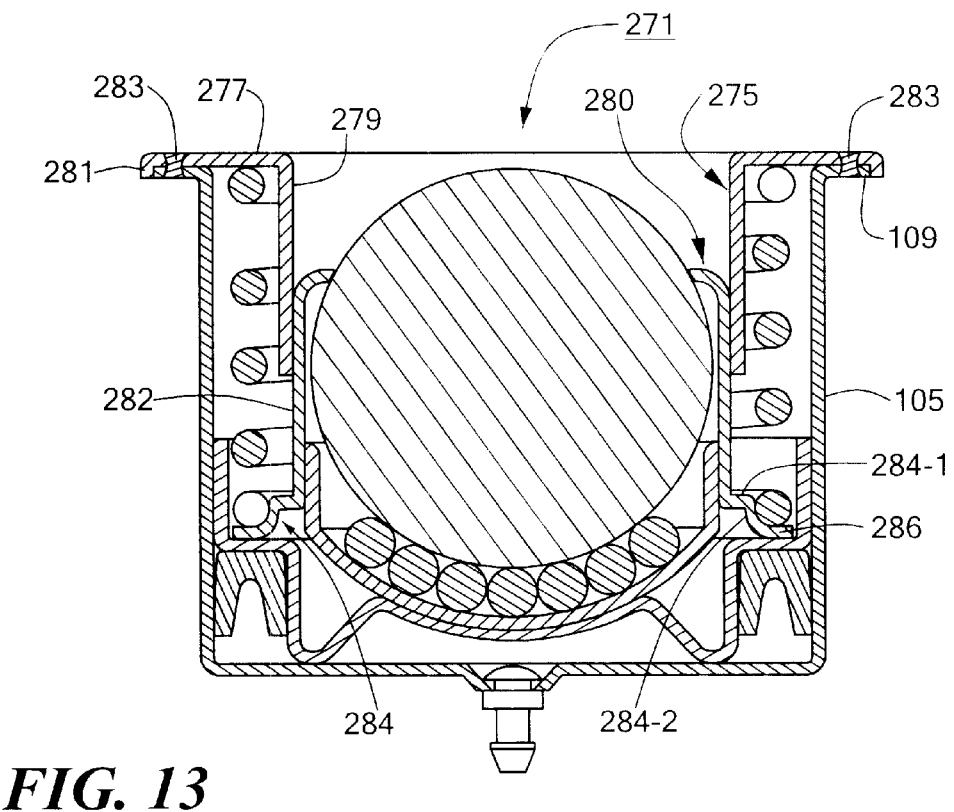
FIG. 13 is a section view of a fifth embodiment of a pneumatic pop-up unit constructed according to the teachings of the present invention, said pneumatic pop-up unit being shown with its piston in the retracted position.
Figure 14:
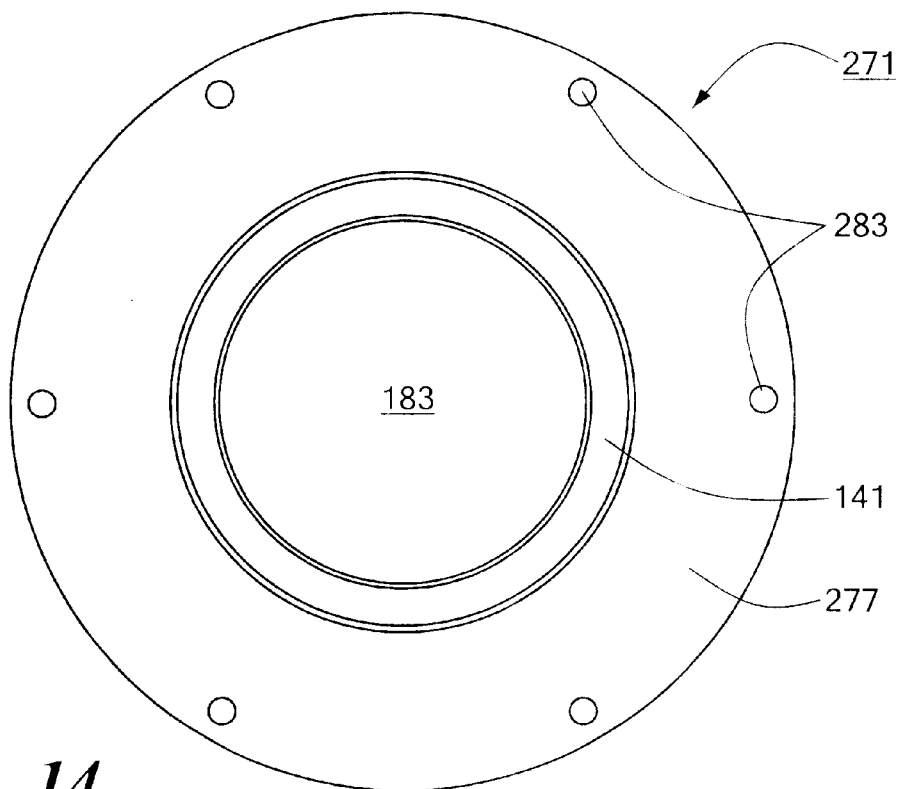
FIG. 14 is a top view of the pneumatic pop-up unit of FIG. 13.

Referring now to FIGS. 13 and 14, there are shown section and top views of a fifth embodiment of a pneumatic pop-up unit constructed according to the teachings of the present invention, said pneumatic pop-up unit being shown represented generally by reference numeral 271.

Unit 271 is similar in many respects to unit 101, one of the principal differences between the two units being that unit 271 comprises a cap 275. Cap 275, which is preferably made of stamped metal, is shaped to include an annular top wall 277, an inner side wall 279 extending downwardly from the inner diameter of wall 277, and an outer side wall 281 extending downwardly from the outer diameter of wall 277. Outer side wall 281, like side wall 127, is dimensioned to extend downwardly across the outside of flange 109 of housing 103. Outer side wall 281, however, differs from side wall 127 in that side wall 281 is not bent around the bottom of flange 109. Instead, the bottom of side wall 281 lies flush with the bottom of flange 109, and cap 275 is secured to housing 103 by means of a plurality of circumferentially-dispersed rivets 283 inserted both through wall 277 of cap 275 and flange 109 of housing 103. As can readily be appreciated, mechanical fastening means other than rivets 283, such as spot-welding, could be used to secure wall 277 to flange 109. Studs could also be used instead of rivets 283; however, such studs preferably would be flush with the top surface of cap 275 so as not to mar the surface of any product rested thereon. Such studs may extend below the surface of flange 109, particularly if the part of the stud extending below flange 109 is threaded and adapted to be used to attach the unit to a surface using nuts or not threaded and used to attach the unit to a surface using press-on spring clips. It should also be understood that side wall 281 could be eliminated.

Unit 271 also differs from unit 101 in that unit 271 includes a piston having a top piece 280. Top piece 280 is a generally cylindrical, hollow member and includes a circular side wall 282, a step 284 at the bottom of side wall 282, a peripheral flange 286 extending radially outwardly from the bottom of step 284, an open bottom and an open top. Side wall 282 is curled (or coined) inwardly at its top end for the reasons discussed above. The horizontal surface 284-1 of step 284 is adapted to serve as a stop for the bottom of side wall 125 of cap 121, and the vertical surface 284-2 of step 284 is engaged by the inner diameter of the bottom end of spring 189.

Figure 15:
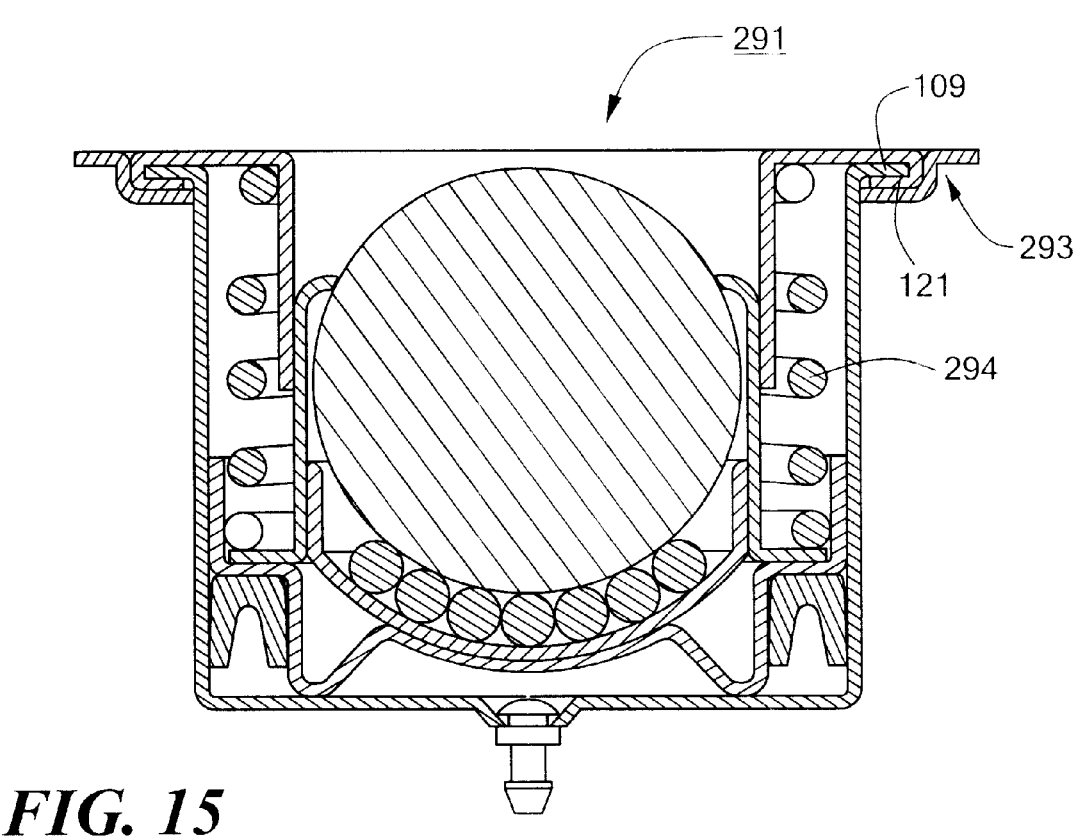
FIG. 15 is a section view of a sixth embodiment of a pneumatic pop-up unit constructed according to the teachings of the present invention, said pneumatic pop-up unit being shown with its piston in the retracted position.

Referring now to FIG. 15, there is shown a section view of a sixth embodiment of a pneumatic pop-up unit constructed according to the teachings of the present invention, said pneumatic pop-up unit being shown represented generally by reference numeral 291.

Figure 16A:
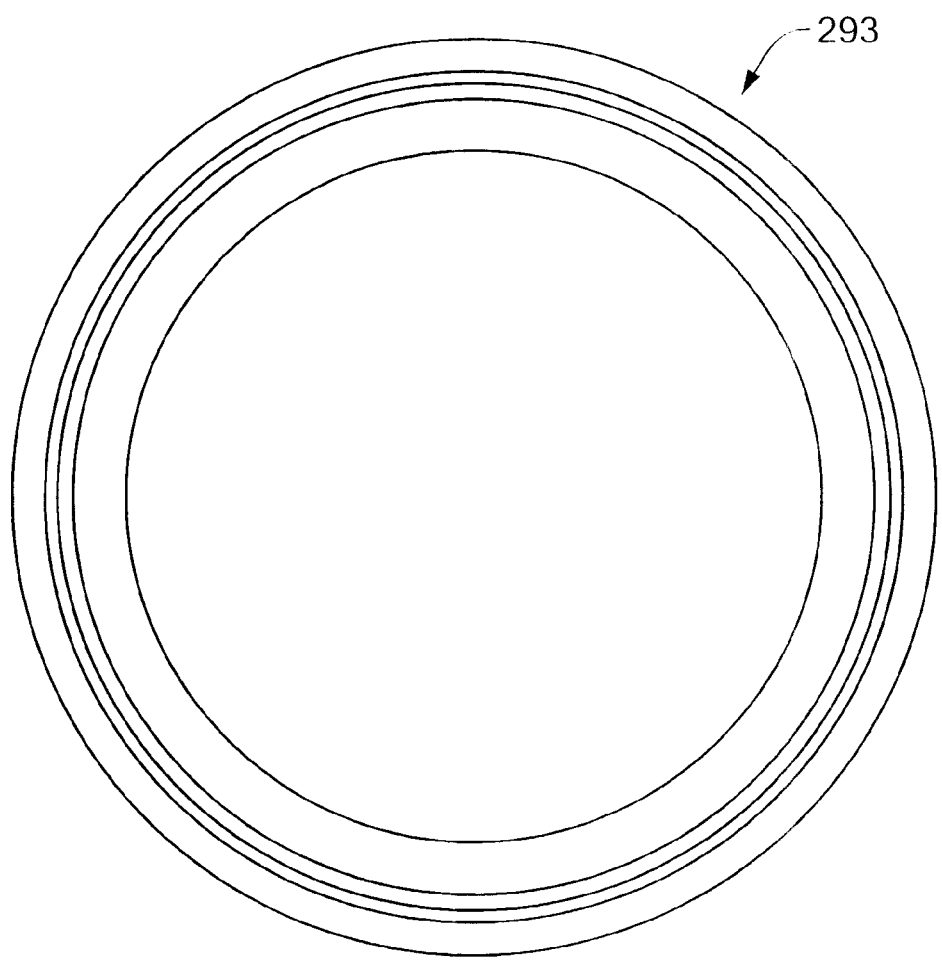
FIGS. 16(a) and 16(b) are top and section views, respectively, of the flange extender of FIG. 15.
Figure 16B:
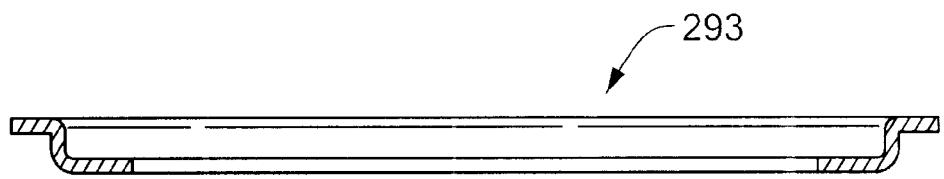

Unit 291 is similar in many respects to unit 101, the principal difference between the two units being that unit 291 additionally includes a flange extender 293 (shown separately in FIGS. 16(a) and 16(b)), extender 293 serving to provide a longer extension for mounting unit 291 in a hole. Flange extender 293, which is annular in shape and preferably made of stamped metal, is appropriately sized to be fitted over the curled-over edges of cap 121.

Unit 291 also differs from unit 101 in that unit 291 includes a conical spring 294.

Figure 17:
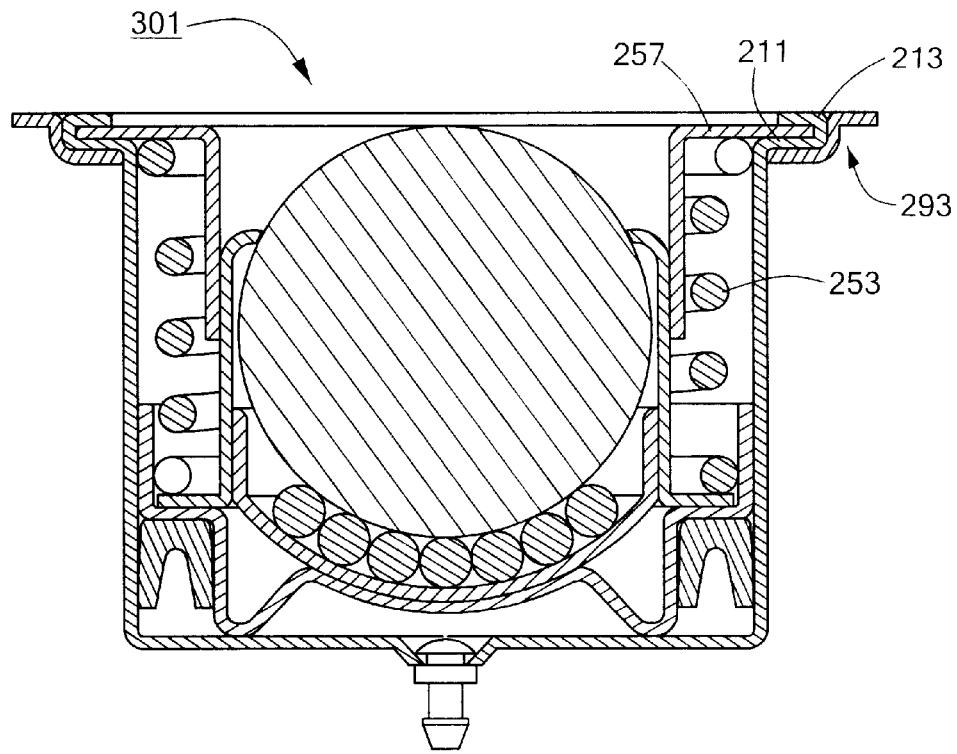
FIG. 17 is a section view of a seventh embodiment of a pneumatic pop-up unit constructed according to the teachings of the present invention, said pneumatic pop-up unit being shown with its piston in the retracted position.

Referring now to FIG. 17, there is shown a section view of a seventh embodiment of a pneumatic pop-up unit constructed according to the teachings of the present invention, said pneumatic pop-up unit being shown represented generally by reference numeral 301.

Unit 301 is similar in many respects to unit 251, the principal difference between the two units being that unit 301 additionally includes flange extender 293 fitted over the curled-up edges of cap 255.

Figure 18:
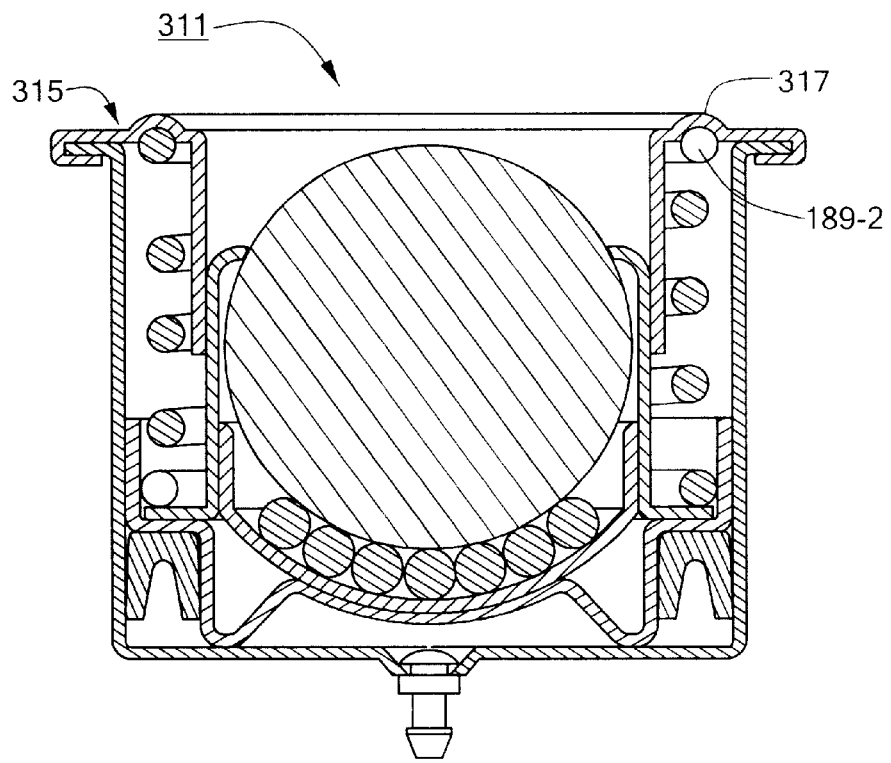
FIG. 18 is a section view of an eighth embodiment of a pneumatic pop-up unit constructed according to the teachings of the present invention, said pneumatic pop-up unit being shown with its piston in the retracted position.

Referring now to FIG. 18, there is shown a section view of an eighth embodiment of a pneumatic pop-up unit constructed according to the teachings of the present invention, said pneumatic pop-up unit being shown represented generally by reference numeral 311.

Unit 311 is similar in many respects to unit 101, the principal difference between the two units being that unit 311 includes a cap 315 having a spring location groove 317 provided therein for locating and receiving the top end 189-2 of spring 189. Cap 315 is preferably made of stamped metal.

Instead of having groove 317, cap 315 could be provided with downward divots for use in locating spring 189. An advantage of such divots over groove 317 would be a flat top surface for cap 315. On the other hand, groove 317 has the advantage of making it harder for an object placed on the unit to slide around when ball 183 is in a retracted position.

Figure 19A:
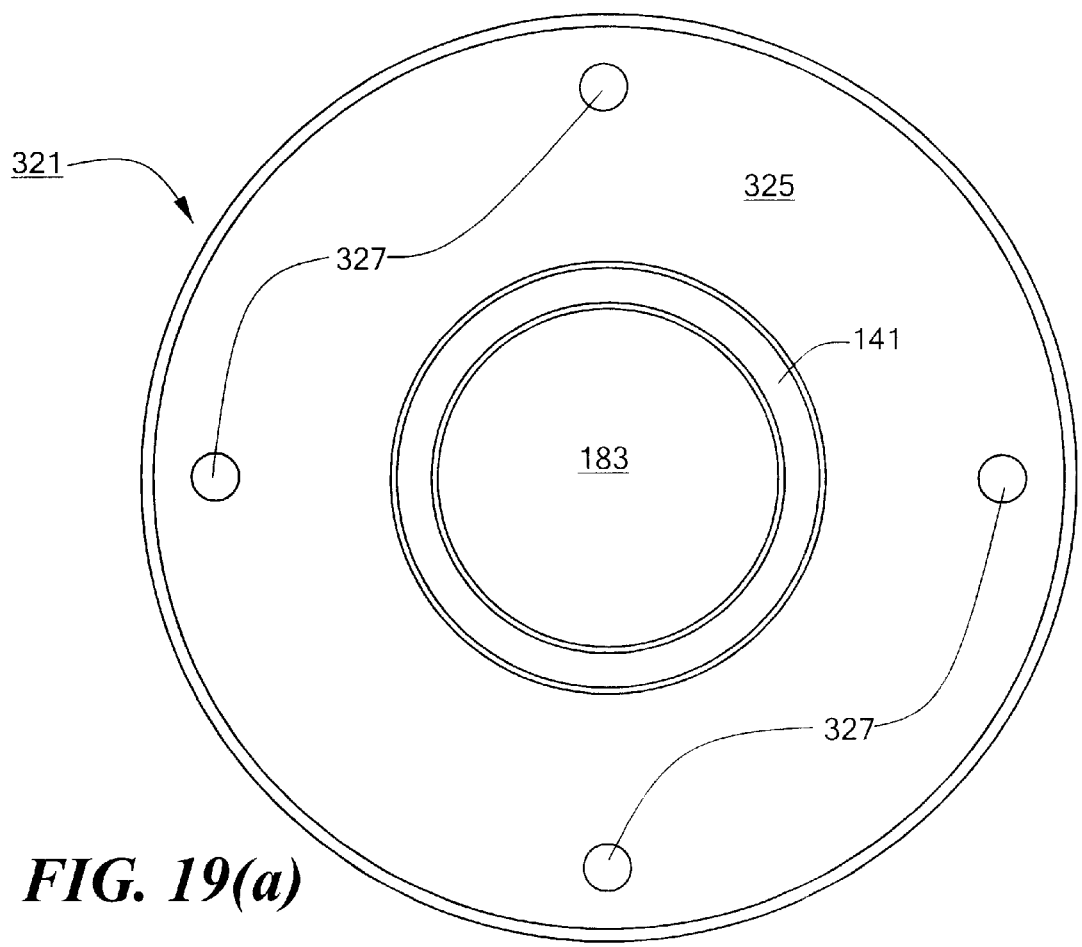
FIGS. 19(a) and 19(b) are top and section views, respectively, of a ninth embodiment of a pneumatic pop-up unit constructed according to the teachings of the present invention, said pneumatic pop-up unit being shown with its piston in the retracted position.
Figure 19B:
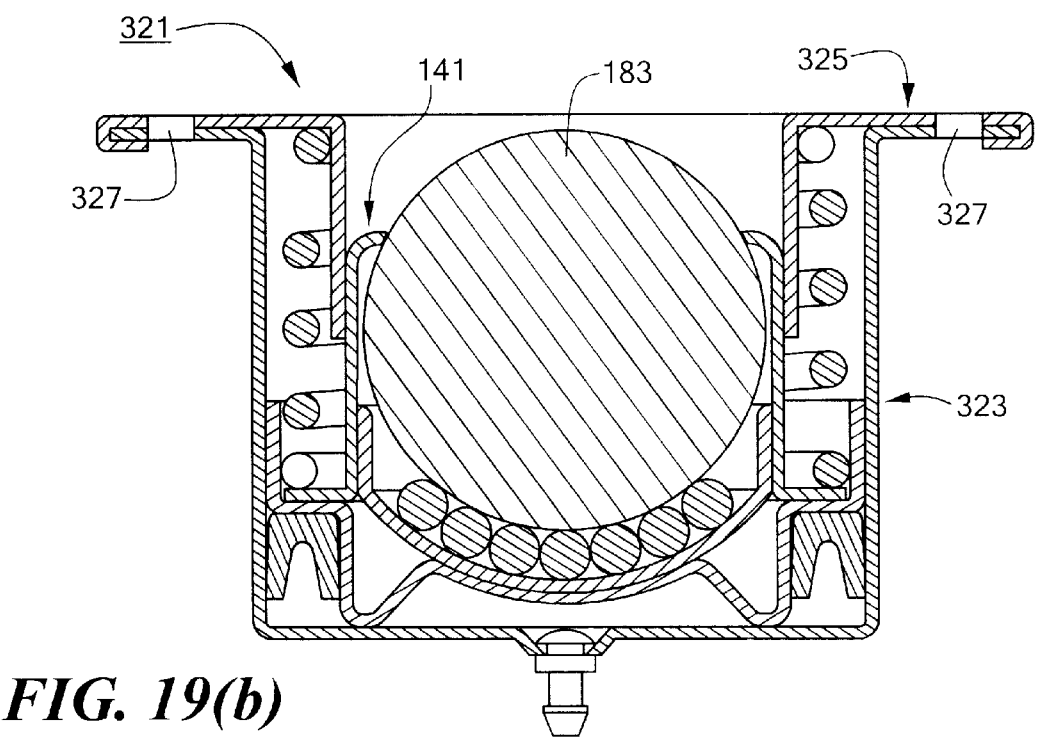

Referring now to FIGS. 19(a) and 19(b), there are shown top and section views, respectively, of a ninth embodiment of a pneumatic pop-up unit constructed according to the teachings of the present invention, said pneumatic pop-up unit being shown represented generally by reference numeral 321.

Unit 321 is similar in many respects to unit 101, the principal difference between the two units being that housing 323 and cap 325 of unit 321 jointly define a plurality of mounting holes 327 through which suitable hardware may be inserted for securely mounting unit 321 in a hole. Instead of holes 327, unit 321 could be provided with mounting studs or press-in threaded nuts, such as PEM fasteners, or the like.

Figure 20:
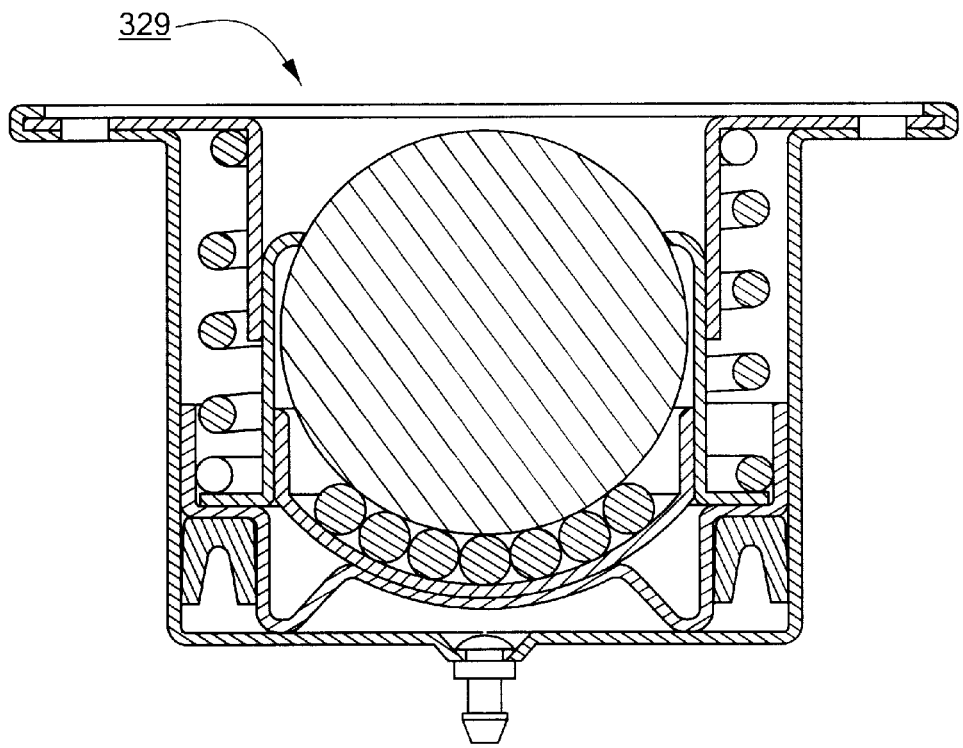
FIG. 20 is a section view of a tenth embodiment of a pneumatic pop-up unit constructed according to the teachings of the present invention, said pneumatic pop-up unit being shown with its piston in the retracted position.

As can readily be appreciated, mounting holes similar to mounting holes 327 (or, alternatively, mounting studs or press-in threaded nuts) could be provided in virtually any of the other pneumatic pop-units discussed above. One example of such a unit provided with said mounting holes is shown in FIG. 20 and represented generally by reference numeral 329.

Figure 21A:
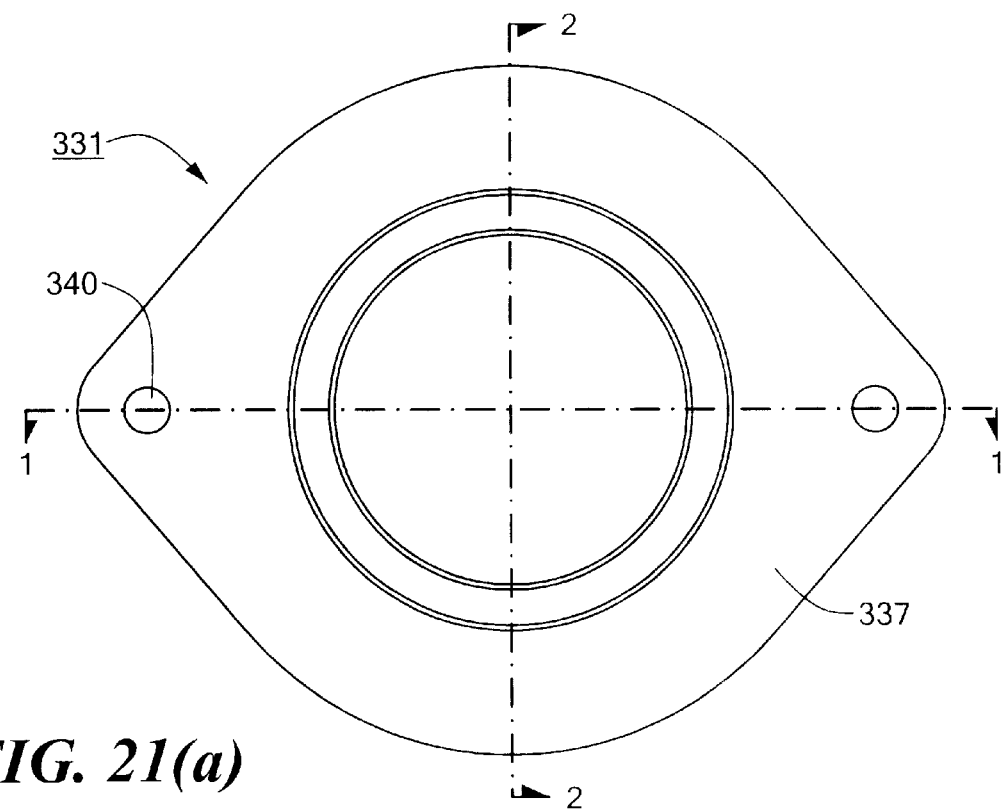
FIG. 21(a) is a top view of an eleventh embodiment of a pneumatic pop-up unit constructed according to the teachings of the present invention.
Figure 21B:
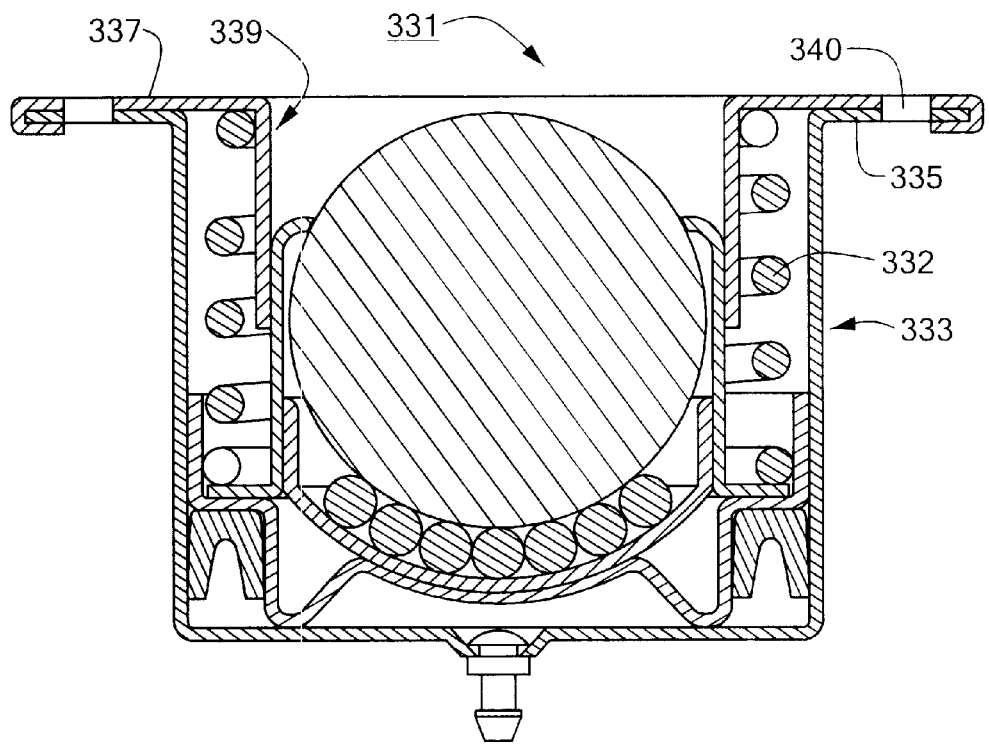
FIGS. 21(b) and 21(c) are section views taken along lines 1—1 and 2—2, respectively, of the pneumatic pop-up unit of FIG. 21 (a)
Figure 21C:
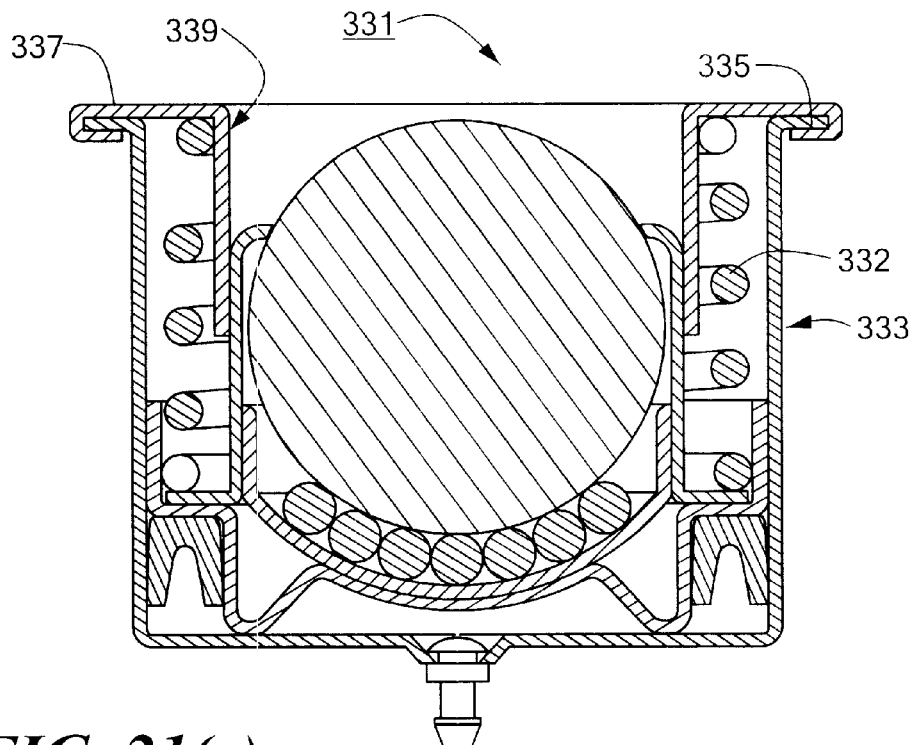

Referring now to FIGS. 21(a) through 21(c), there are shown various views of an eleventh embodiment of a pneumatic pop-up unit constructed according to the teachings of the present invention, said pneumatic pop-up unit being shown represented generally by reference numeral 331.

Unit 331 is similar in many respects to unit 101, one of the principal differences between the two units being that housing 333 of unit 331 has a generally oval-shaped flange 335, instead of a circularly-shaped flange, and that top wall 337 of cap 339 has a correspondingly oval overall shape. Another difference is that unit 331 has a conical spring 332. Still another difference between unit 331 and unit 101 is that unit 331 is provided with a pair of mounting holes 340, one such mounting hole 340 being located at each end (i.e., ear) of the flange.

As can readily be appreciated, the number of mounting holes and the irregular shape of unit 331 are illustrative only.

Flange 335 and top wall 337 could be any number of other shapes and could have any number of mounting holes provided therein. Moreover, this is true for the other pneumatic pop-up units of the present invention.

Figure 22:
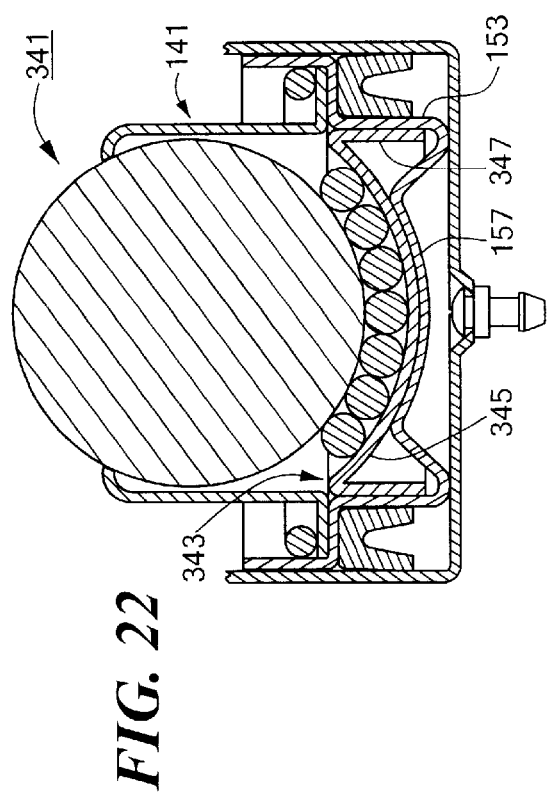
FIG. 22 is a fragmentary section view of a twelfth embodiment of a pneumatic pop-up unit constructed according to the teachings of the present invention.

Referring now to FIG. 22, there is shown a fragmentary section view of a twelfth embodiment of a pneumatic pop-up unit constructed according to the teachings of the present invention, said pneumatic pop-up unit being represented generally by reference numeral 341.

Unit 341 is similar in many respects to unit 101, the principal difference between the two units being that unit 341 includes a race 343, instead of race 171. Race 343, which is preferably made of stamped metal, is shaped to include an upwardly facing bowl-shaped bottom wall 345 and a circular side wall 347 extending downwardly from the periphery of bottom wall 345. Bottom wall 345 conforms to the shape of and sits on top of central portion 157 of bottom piece 143, with side wall 347 abutting the inner surface of side wall 153 of lower piece 143.

Figure 23:
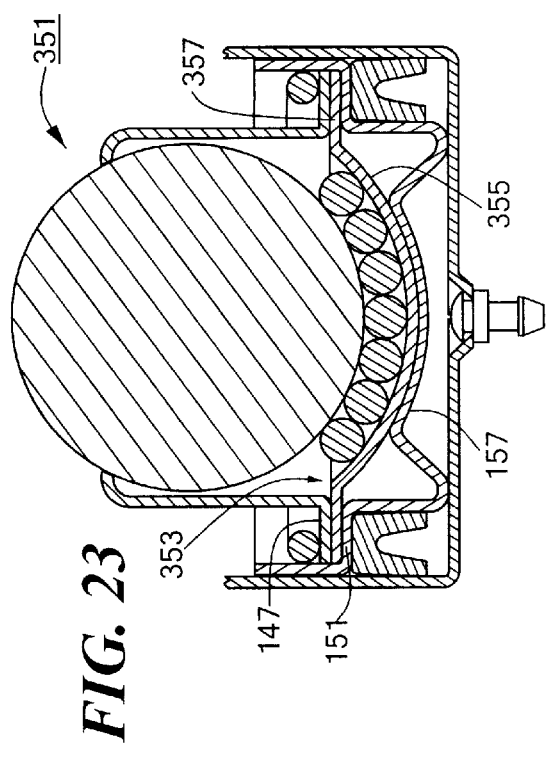
FIG. 23 is a fragmentary section view of a thirteenth embodiment of a pneumatic pop-up unit constructed according to the teachings of the present invention.

Referring now to FIG. 23, there is shown a fragmentary section view of a thirteenth embodiment of a pneumatic pop-up unit constructed according to the teachings of the present invention, said pneumatic pop-up unit being represented generally by reference numeral 351.

Unit 351 is similar in many respects to unit 101, the principal difference between the two units being that unit 351 includes a race 353, instead of race 171. Race 353, which is preferably made of stamped metal, is shaped to include an upwardly facing bowl-shaped bottom wall 355 and a circumferential flange 357 extending radially away from the periphery of bottom wall 355. Bottom wall 355 conforms to the shape of and sits on top of central portion 157 of bottom piece 143, and flange 357 is retained between flange 147 and shelf 151.

Figure 24:
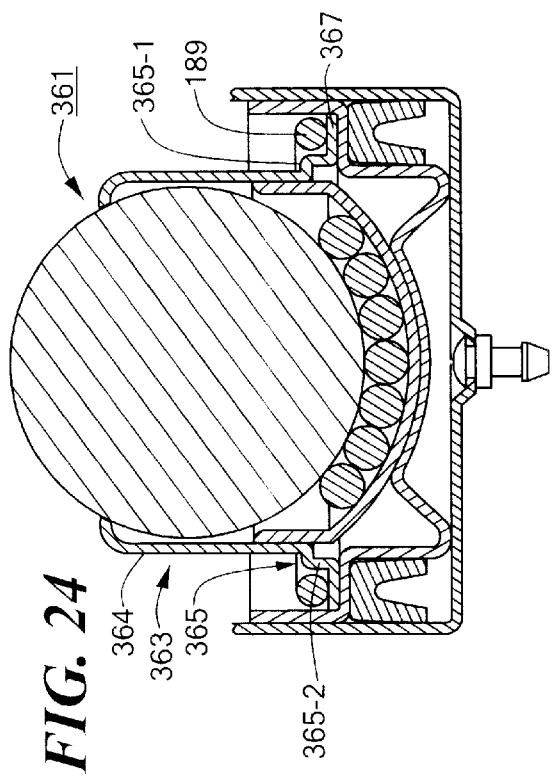
FIG. 24 is a fragmentary section view of a fourteenth embodiment of a pneumatic pop-up unit constructed according to the teachings of the present invention.

Referring now to FIG. 24, there is shown a fragmentary section view of a fourteenth embodiment of a pneumatic pop-up unit constructed according to the teachings of the present invention, said pneumatic pop-up unit being represented generally by reference numeral 361.

Unit 361 is similar in many respects to unit 101, the principal difference between the two units being that unit 361 includes a top piston piece 363, instead of top piece 141. Top piece 363 is a generally cylindrical, hollow member and includes a circular side wall 364, a step 365 at the bottom of side wall 364, a peripheral flange 367 extending radially outwardly from the bottom of step 365, an open bottom and an open top. Side wall 364 is curled inwardly at its top end for the reasons discussed above. The horizontal surface 365-1 of step 365 is adapted to serve as a stop for the bottom of side wall 125 of cap 121, and the vertical surface 365-2 of step 365 is engaged by the inner diameter of the bottom end of spring 189.

Figure 25:
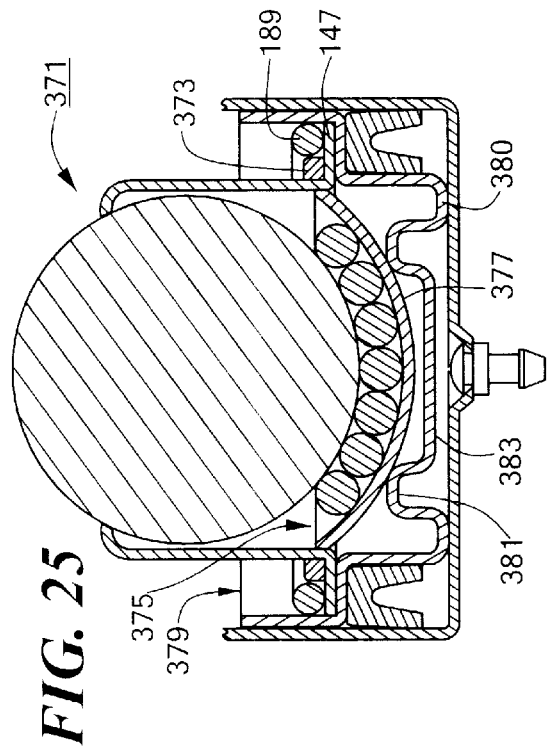
FIG. 25 is a fragmentary section view of a fifteenth embodiment of a pneumatic pop-up unit constructed according to the teachings of the present invention.

Referring now to FIG. 25, there is shown a fragmentary section view of a fifteenth embodiment of a pneumatic pop-up unit constructed according to the teachings of the present invention, said pneumatic pop-up unit being represented generally by reference numeral 371.

Unit 371 is similar in many respects to unit 101, one of the principal differences between the two units being that unit 371 further includes a washer 373 seated on top of flange 147, the top surface of washer 373 being adapted to serve as a stop for the bottom of side wall 125 of cap 121, the outer surface of washer 373 being engageable by the inner diameter of the bottom end of spring 189. Another principal difference between unit 371 and unit 101 is that unit 371 includes a race 375, instead of race 171. Race 375, which is preferably made of stamped metal, is shaped only to include an upwardly facing bowl-shaped bottom wall 377. The remaining principal difference between units 371 and 101 is that the bottom piece 379 of the piston of unit 371 has a bottom wall 380 distinguished by a circular inverted U-shaped groove 381 circumscribing an elevated disc-shaped central portion 383.

Figure 26:
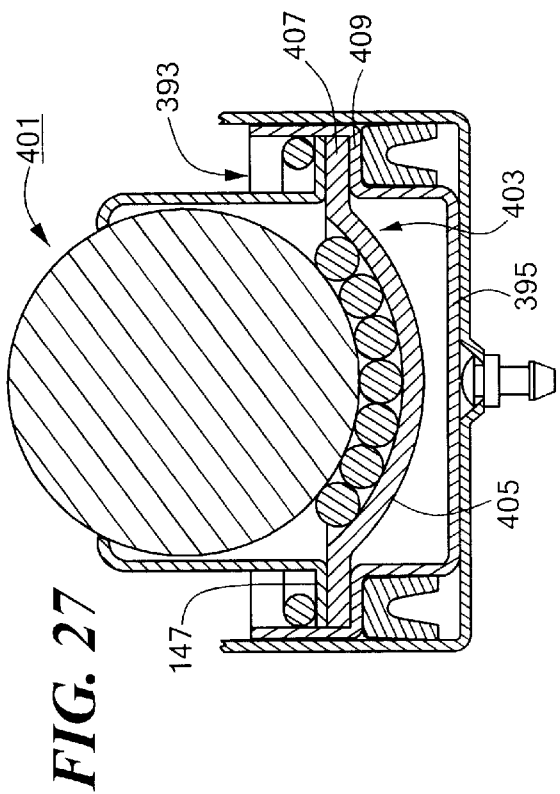
FIG. 26 is a fragmentary section view of a sixteenth embodiment of a pneumatic pop-up unit constructed according to the teachings of the present invention.

Referring now to FIG. 26, there is shown a fragmentary section view of a sixteenth embodiment of a pneumatic pop-up unit constructed according to the teachings of the present invention, said pneumatic pop-up unit being represented generally by reference numeral 391.

Unit 391 is similar in many respects to unit 341, the principal difference between the two units being that unit 391 includes a bottom piece 393 having a flat bottom wall 395, instead of having a convoluted bottom wall.

Figure 27:
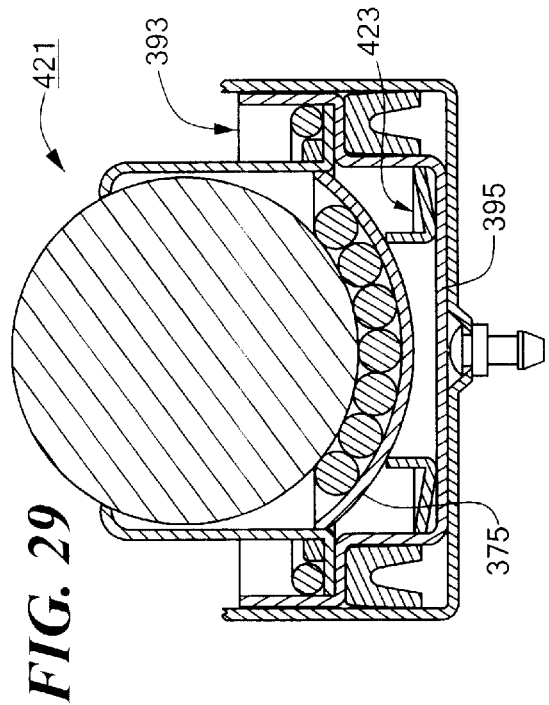
FIG. 27 is a fragmentary section view of a seventeenth embodiment of a pneumatic pop-up unit constructed according to the teachings of the present invention.

Referring now to FIG. 27, there is shown a fragmentary section view of a seventeenth embodiment of a pneumatic pop-up unit constructed according to the teachings of the present invention, said pneumatic pop-up unit being represented generally by reference numeral 401.

Unit 401 is similar in many respects to unit 391, the principal difference between the two units being that unit 401 includes a race 403, instead of race 343. Race 403, which is preferably made of stamped metal, is shaped to include an upwardly facing bowl-shaped bottom wall 405 and a circumferential flange 407 extending radially away from the periphery of bottom wall 405. Flange 407 is retained between flange 147 and a shelf 409 formed in bottom piece 393. As can be seen, because bottom wall 405 of race 403 is not supported by bottom wall 395 of bottom piece 393, race 403 preferably has an increased thickness for additional strength.

Figure 28:
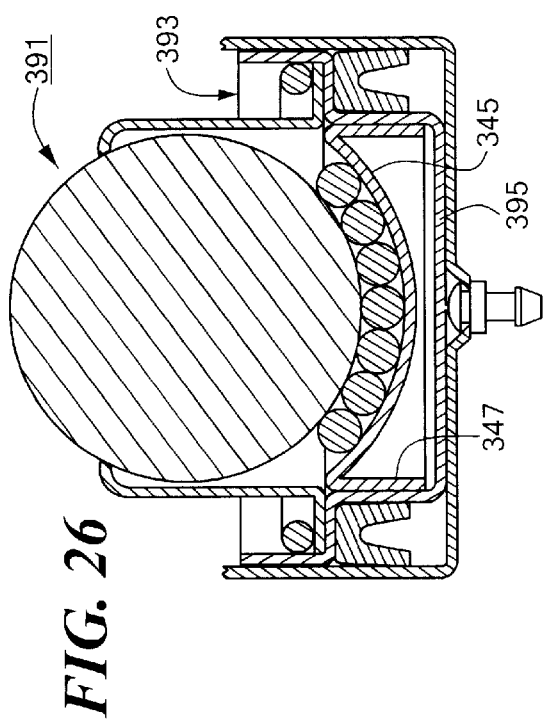
FIG. 28 is a fragmentary section view of an eighteenth embodiment of a pneumatic pop-up unit constructed according to the teachings of the present invention.

Referring now to FIG. 28, there is shown a fragmentary section view of an eighteenth embodiment of a pneumatic pop-up unit constructed according to the teachings of the present invention, said pneumatic pop-up unit being represented generally by reference numeral 411.

Unit 411 is similar in many respects to unit 361, the principal differences between the two units being that unit 411 includes bottom piston piece 393, instead of bottom piston piece 143, and that unit 411 further includes a washer 413 seated on top of bottom wall 395 of bottom piston piece 393 for providing support to race 171.

Figure 29:
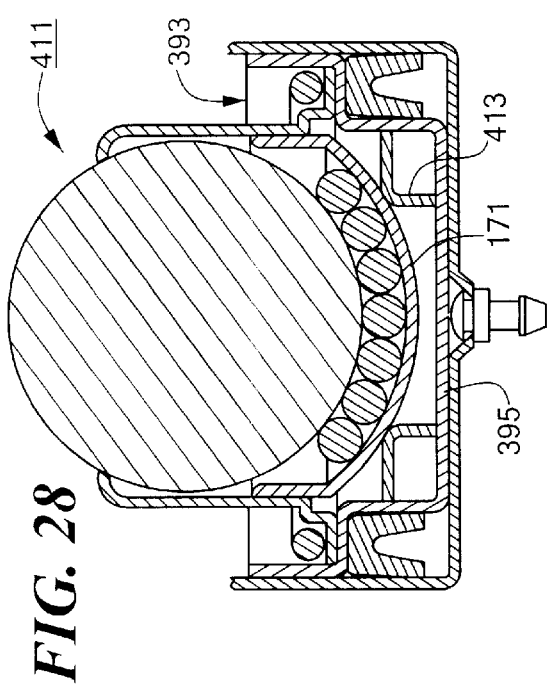
FIG. 29 is a fragmentary section view of a nineteenth embodiment of a pneumatic pop-up unit constructed according to the teachings of the present invention.

Referring now to FIG. 29, there is shown a fragmentary section view of a nineteenth embodiment of a pneumatic pop-up unit constructed according to the teachings of the present invention, said pneumatic pop-up unit being represented generally by reference numeral 421.

Unit 421 is similar in many respects to unit 371, the principal differences between the two units being that unit 421 includes bottom piece 393, instead of bottom piece 143, and that unit 421 further includes a washer 423 seated on top of bottom wall 395 of bottom piece 393 for providing support to race 375.

Figure 30:
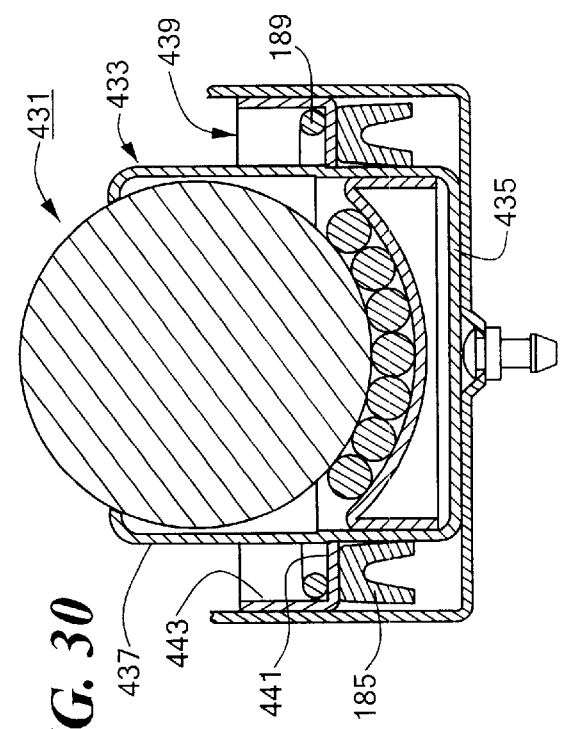
FIG. 30 is a fragmentary section view of a twentieth embodiment of a pneumatic pop-up unit constructed according to the teachings of the present invention.

Referring now to FIG. 30, there is shown a fragmentary section view of a twentieth embodiment of a pneumatic pop-up unit constructed according to the teachings of the present invention, said pneumatic pop-up unit being represented generally by reference numeral 431.

Unit 431 is similar in certain respects to unit 391, one notable difference between the two units being that unit 431 comprises a one-piece piston 433, instead of the two-piece piston of unit 391. Piston 433, which is identical to piston 41 of unit 11, comprises a bottom wall 435 and a circular side wall 437, side wall 437 extending upwardly from bottom wall 435 and being rolled or coined inwardly at its top end. Unit 431 also comprises a washer 439 press-fit to the outer surface of side wall 437, washer 439 having an annular bottom wall 441 and a circular side wall 443, side wall 443 extending upwardly from bottom wall 441. Washer 439 is preferably made of stamped metal. The top surface of wall 441, the inner surface of wall 443 and the outer surface of wall 437 jointly define an annular U-shaped structure for receiving the bottom end of spring 189 (and for collecting debris entering into unit 431 from its open top end). The bottom surface of wall 441 acts as a stop for restricting upward movement of seal 185 relative to side wall 437.

Figure 31:
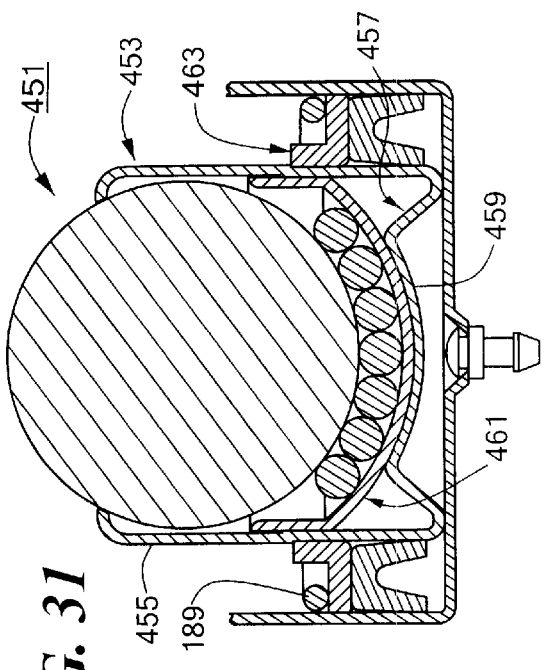
FIG. 31 is a fragmentary section view of a twenty-first embodiment of a pneumatic pop-up unit constructed according to the teachings of the present invention.

Referring now to FIG. 31, there is shown a fragmentary section view of a twenty-first embodiment of a pneumatic pop-up unit constructed according to the teachings of the present invention, said pneumatic pop-up unit being represented generally by reference numeral 451.

Unit 451 is similar in certain respects to unit 431, one of the principal differences between the two units being that unit 451 includes a one-piece piston 453 having a circular side wall 455 and a bottom wall 457, bottom wall 457 extending upwardly and radially inwardly from the bottom of side wall 453 for a short distance and then forming an upwardly facing bowl-shaped central portion 459. Unit 451 also differs from unit 431 in that unit 451 includes a race 461 identical to race 171 and in that unit 451 includes a differently-shaped washer 463.

Figure 32:
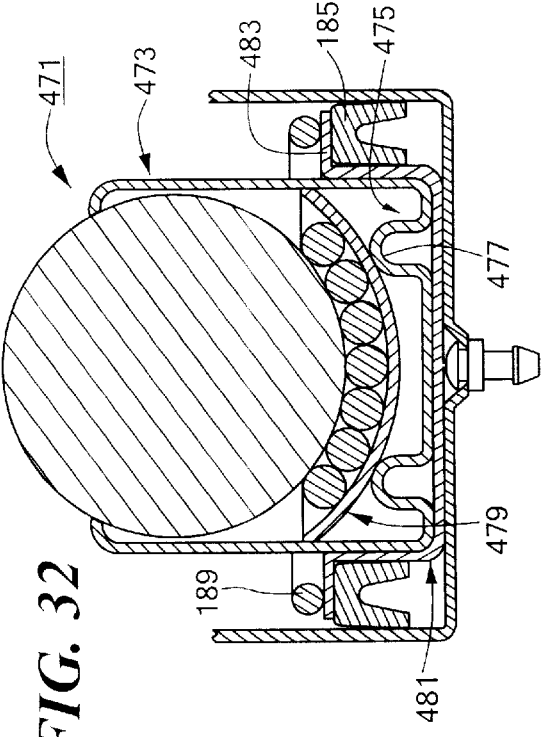
FIG. 32 is a fragmentary section view of a twenty-second embodiment of a pneumatic pop-up unit constructed according to the teachings of the present invention.

Referring now to FIG. 32, there is shown a fragmentary section view of a twenty-second embodiment of a pneumatic pop-up unit constructed according to the teachings of the present invention, said pneumatic pop-up unit being represented generally by reference numeral 471.

Unit 471 is similar in some respects to unit 431, one of the principal differences between the two units being that unit 471 comprises a one-piece piston 473 having a bottom wall 475 distinguished by an annular inverted U-shaped groove 477. Unit 471 also differs from unit 431 in that unit 471 includes a race 479 that is identical to race 375. Unit 471 further differs from unit 431 in that unit 471 includes, instead of washer 439, a hat-shaped cap 481 fitted over the bottom end of piston 473. Cap 481 is shaped to include a circumferential flange 483, the top surface of which is used to receive the bottom end of spring 189 and the bottom surface of which is used to retain seal 185.

Figure 33:
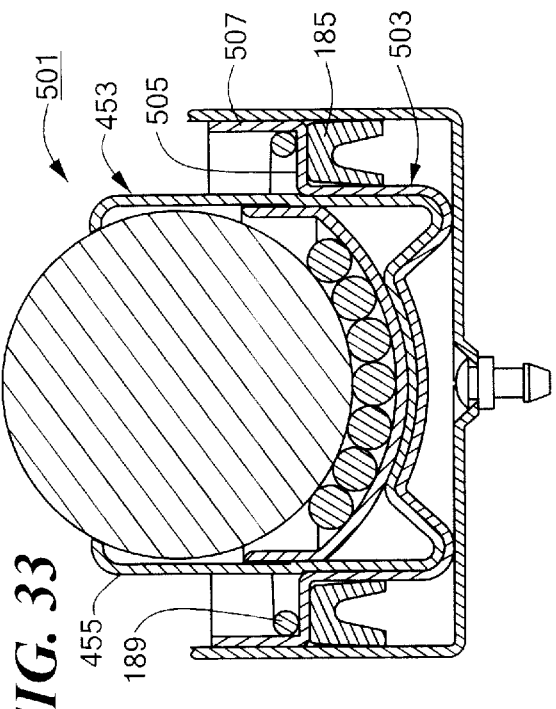
FIG. 33 is a fragmentary section view of a twenty-third embodiment of a pneumatic pop-up unit constructed according to the teachings of the present invention.

Referring now to FIG. 33, there is shown a fragmentary section view of a twenty-third embodiment of a pneumatic pop-up unit constructed according to the teachings of the present invention, said pneumatic pop-up unit being represented generally by reference numeral 501.

Unit 501 is similar in many respects to unit 451, the principal difference between the two units being unit 501 includes, instead of washer 463, a cap 503 shaped to fit over the bottom end of piston 453. Cap 503 is shaped to include a circumferential flange 505 and a side wall 507 extending upwardly a short distance from flange 505. Flange 505, side wall 507 and side wall 455 jointly define an annular U-shaped structure for receiving the bottom end of spring 189 (and for collecting debris). The bottom surface of flange 505 acts as a stop for restricting upward movement of seal 185 relative to side wall 455.

As can readily be appreciated, variations to the above-described units of the present invention can be derived by mixing and matching the various components thereof. In addition, there are disclosed in FIGS. 34(a) through 34(l) a number of variations to the above-described multi-piece pistons, with and without spring receptacles/seal stops. The multi-piece pistons of FIGS. 34(a) through 34(l) are distinguishable from the other multi-piece pistons described above in that, in each case, the top piece of the piston is not merely seated on top of the bottom piece of the piston but is secured thereto by providing a flange in at least one of the two pieces and then bending the other piece around the flange.

As can also readily be appreciated, any of the units of the present invention could be modified by replacing the primary ball/ball bearing/race combination thereof with a stopper or other conventional contact element.

As discussed earlier, one of the problems with existing pneumatic pop-up units is that the cap cannot be removed from its associated housing and later re-attached thereto. Consequently, when components of the unit become worn and/or dirty over time, the entire unit must be replaced.

Figure 35A:
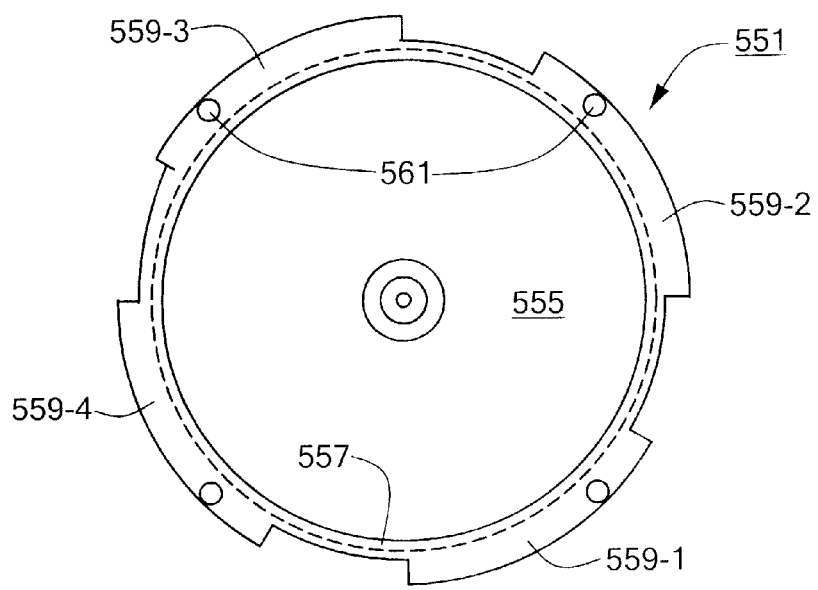
FIGS. 35(a) and 35(b) are top views of a housing and a cap, respectively, adapted for use in the pneumatic pop-up unit of the present invention, said housing and said cap being constructed so as to be removably securable to one another.
Figure 35B:
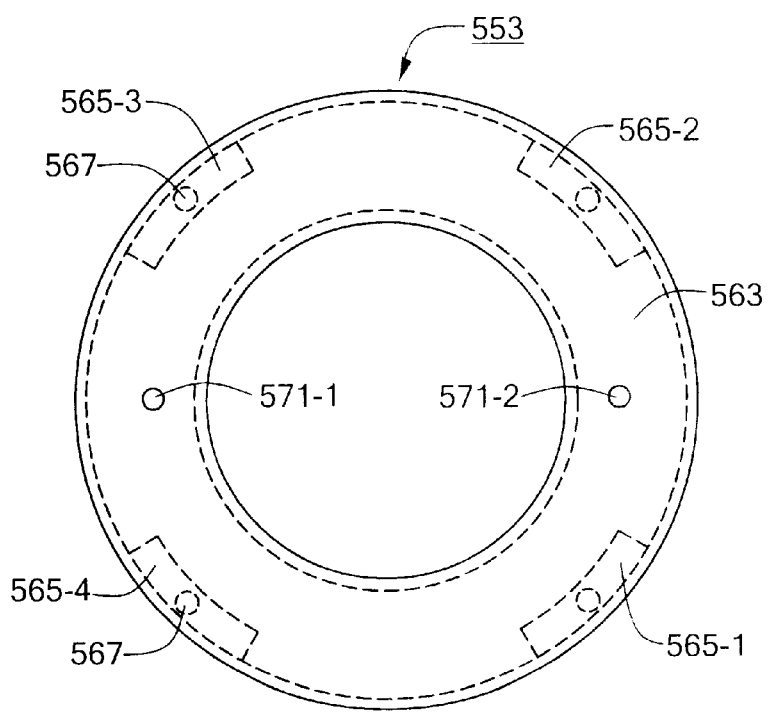

Referring now to FIGS. 35(a) and 35(b), there are shown top views of a housing 551 and a cap 553, respectively, housing 551 and cap 553 being constructed so as to be removably securable to one another to permit the facile cleaning and replacement of components disposed within housing 551. Housing 551 and cap 553 are preferably made of stamped metal.

Housing 551, which is a generally cylindrically-shaped member having a bottom wall 555, a side wall 557, and an open top, is shaped to include a plurality of spaced-apart, radially outwardly extending flanges 559-1 through 559-4, each of flanges 559-1 through 559-4 extending partially around the perimeter of side wall 557. A hole 561, whose purpose will become apparent below, is provided in each flange 559.

Cap 553 comprises an annular top wall 563 and a plurality of spaced-apart bendable tabs 565-1 through 565-4 extending downwardly from the outer diameter of top wall 563. A dimple 567 suitably sized for insertion through hole 561 is formed in each tab 565. Tabs 565-1 through 565-4 are appropriately dimensioned and spaced from one another to permit alignment of dimples 567-1 through 567-4 with holes 561-1 through 561-4, respectively.

To secure cap 553 to housing 551, cap 553 is placed on top of housing 551, with tabs 565 extending into the spaces between flanges 559. Tabs 565 are then bent inwardly, and cap 553 is rotated relative to housing 551 until dimples 567 are aligned with and extend through holes 561. A pair of holes 571-1 and 571-2 are preferably provided in top wall 563 of cap 553 to permit a face spanner wrench or the like to be used to rotate cap 553 relative to housing 551.

Cap 553 may be removed from housing 551 by rotating cap 553 relative to housing 551 until tabs 565 are positioned in the spaces between adjacent flanges 559.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A pneumatic pop-up unit comprising:
(a) a housing having a bottom wall, a side wall extending upwardly from said bottom wall, a flange extending outwardly from the top of said side wall, and an open top;
(b) a piston slidable within said housing between a lower position and an upper position, said piston having an upper opening;

(c) a contact element seated within said piston and partially extending through the upper opening of the piston;

(d) a cap positioned on top of said open top of said housing and secured to said flange of said housing, said cap having a central opening through which said contact element partially extends when said piston is in said upper position;

(e) a spring for biasing said piston toward said lower position; and (f) a nipple mounted in said housing for use in admitting fluid under pressure to said housing to elevate said piston against the bias of said spring toward said upper position.

2. The pneumatic pop-up unit as claimed in claim 1 wherein said contact element is an omni-directional ball and wherein said contact element is positioned below said central opening of said cap when said piston is in said lower position.

3. The pneumatic pop-up unit as claimed in claim 2 wherein said side wall of said housing is generally circular in shape.

4. The pneumatic pop-up unit as claimed in claim 3 wherein said flange is a circumferential flange.

5. The pneumatic pop-up unit as claimed in claim 4 wherein said cap includes a top wall, said central opening being provided in said top wall, and wherein said top wall is secured to said circumferential flange by a plurality of mechanical fasteners extending through said top wall and said circumferential flange.

6. The pneumatic pop-up unit as claimed in claim 4 wherein said cap includes a top wall and an outer side wall, said central opening being provided in said top wall, said outer side wall extending downwardly from the outer perimeter of said top wall and being bent around and under said circumferential flange.

7. The pneumatic pop-up unit as claimed in claim 6 further comprising a flange extender mounted over the bent-under ends of said outer side wall of said cap.

8. The pneumatic pop-up unit as claimed in claim 4 wherein said cap has a top wall, said central opening being provided in said top wall, and wherein said housing further comprises an outer side wall extending upwardly from the outer perimeter of said circumferential flange and being bent around and over said top wall of said cap.

9. The pneumatic pop-up unit as claimed in claim 8 further comprising a flange extender mounted over the bent-over ends of said outer side wall of said housing.

10. The pneumatic pop-up unit as claimed in claim 4 wherein said cap has a top wall and a vertically offset annulus, said central opening being provided in said top wall, and wherein said housing further comprises an outer side wall extending upwardly from the outer perimeter of said circumferential flange and being bent around and over said vertically offset annulus of said cap.

11. The pneumatic pop-up unit as claimed in claim 4 wherein said cap has an annular top wall and an inner side wall, said inner side wall extending downwardly from the inside diameter of said top wall into said housing through said open top, said annular top wall being disposed on top of said circumferential flange.

12. The pneumatic pop-up unit as claimed in claim 11 wherein said spring is a conical spring, said conical spring having an upper end engaged by the outer surface of said inner side wall of said cap and by the lower surface of said annular top wall of said cap.

13. The pneumatic pop-up unit as claimed in claim 11 wherein said spring is a straight spring.

14. The pneumatic pop-up unit as claimed in claim 13 further comprising a spring retainer, said spring retainer engaging the inner diameter of the upper end of said straight spring.

15. The pneumatic pop-up unit as claimed in claim 13 wherein said annular top wall of said cap is shaped to include a spring location groove for receiving the upper end of said straight spring.

16. The pneumatic pop-up unit as claimed in claim 11 wherein said spring has an upper end engaged by the inner surface of said side wall of said housing and by the lower surface of said annular top wall of said cap.

17. The pneumatic pop-up unit as claimed in claim 4 wherein said cap is shaped to include a top wall, said central opening being provided in said top wall, said top wall being disposed on top of said circumferential flange, and wherein said top wall and said circumferential flange are provided with matching mounting holes.

18. The pneumatic pop-up unit as claimed in claim 17 wherein said cap is shaped to include a top wall, said central opening being provided in said top wall, said top wall being disposed on top of said circumferential flange, and wherein said top wall and said circumferential flange are shaped to include at least one ear-shaped elongation.

19. The pneumatic pop-up unit as claimed in claim 18 wherein said top wall and said circumferential flange are substantially oval in shape.

20. The pneumatic pop-up unit as claimed in claim 18 wherein said top wall of said cap and said circumferential flange of said housing are provided with at least one set of matching mounting holes.

21. The pneumatic pop-up unit as claimed in claim 1 wherein said cap is removably mounted on said housing.

22. The pneumatic pop-up unit as claimed in claim 1 wherein said cap and said housing are made of stamped metal.

23. A pneumatic pop-up unit comprising:

(a) a housing having a bottom wall, a side wall extending upwardly from said bottom wall, a plurality of flanges extending outwardly from the top of said side wall, and an open top wherein said flanges are equidistantly separated by spaces;

(b) a piston slidable within said housing between a lower position and an upper position, said piston having an upper opening;

(c) a contact element seated within said piston and partially extending through the upper opening of the piston;

(d) a cap positioned on top of said open top of said housing, said cap being shaped to include a top wall and a plurality of tabs extending downwardly and inwardly from the outer perimeter of said top wall, said top wall being provided with a central opening through which said contact element partially extends when said piston is in said upper position, at least one of said tabs and said flanges being provided with means for releasably securing said tabs to said flanges, said tabs being appropriately sized for insertion through said spaces between said flanges;

(e) a spring for biasing said piston toward said lower position; and (f) a nipple mounted in said housing for use in admitting fluid under pressure to said housing to elevate said piston against the bias of said spring toward said upper position.

24. A pneumatic pop-up unit comprising:
(a) a housing having a bottom wall, a side wall extending upwardly from said bottom wall, and an open top;
(b) a multi-piece piston slidable within said housing between a lower position and an upper position, said multi-piece piston comprising a top piece shaped to include a generally cylindrical side wall, an open top and an open bottom, the top edges of said generally cylindrical side wall being curled inwardly;
(c) a contact element seated within said multi-piece piston and partially extending through the open top of said top piece of said multi-piece piston, said contact element being retained within said multi-piece piston by the inwardly-curled top edges of said generally cylindrical side wall;
(d) a cap positioned on top of said open top of said housing and secured to said housing, said cap having a central opening through which said contact element partially extends when said multi-piece piston is in said upper position;
(e) a spring for biasing said multi-piece piston toward said lower position; and
(f) a nipple mounted in said housing for use in admitting fluid under pressure to said housing to elevate said multi-piece piston against the bias of said spring toward said upper position.

25. The pneumatic pop-up unit as claimed in claim 24 wherein said contact element is an omni-directional ball and wherein said contact element is positioned below said central opening in said cap when said multi-piece piston is in said lower position.

26. The pneumatic pop-up unit as claimed in claim 25 further comprising a race disposed within said multi-piece piston and a plurality of ball bearings disposed within said race, said omni-directional ball being seated on top of said ball bearings.

27. The pneumatic pop-up unit as claimed in claim 26 wherein said top piece of said multi-piece piston is further shaped to include a circumferential flange extending outwardly from the bottom of said side wall.

28. The pneumatic pop-up unit as claimed in claim 27 wherein said side wall of said top piece of said multi-piece piston is further shaped to include a step proximate to its bottom edge.

29. The pneumatic pop-up unit as claimed in claim 27 wherein said multi-piece piston further comprises a bottom piece, said bottom piece being shaped to include an open top, a circular upper side wall, an annular shelf extending radially inwardly a short distance from the bottom of said circular upper side wall, a circular lower side wall extending downwardly a short distance from the inner diameter of said shelf, and a bottom wall, said circumferential flange of said top piece being seated on top of said shelf of said bottom piece.

30. The pneumatic pop-up unit as claimed in claim 29 wherein said race includes a bottom wall in the shape of an upwardly facing bowl and a circular side wall extending upwardly from the outer periphery of said bottom wall.

31. The pneumatic pop-up unit as claimed in claim 30 wherein said bottom wall of said bottom piece is shaped to include a central portion having an upwardly facing bowl-shape, said bottom wall of said race being seated on said central portion of said bottom wall of said bottom piece.

32. The pneumatic pop-up unit as claimed in claim 29 wherein said race is a concave-up bowl.

33. The pneumatic pop-up unit as claimed in claim 29 wherein said race is shaped to include a bottom wall having an upwardly facing bowl-shape and a circular side wall extending downwardly from the outer periphery of said bottom wall.

34. The pneumatic pop-up unit as claimed in claim 29 wherein said race is shaped to include a bottom wall having an upwardly facing bowl-shape and a circumferential flange extending radially away from the outer periphery of said bottom wall, said circumferential flange being disposed between said circumferential flange of said top piece and said shelf of said bottom piece.

35. The pneumatic pop-up unit as claimed in claim 34 wherein said bottom wall of said bottom piece is flat.

36. The pneumatic pop-up unit as claimed in claim 30 wherein said bottom wall of said bottom piece is flat.

37. The pneumatic pop-up unit as claimed in claim 36 further comprising a washer, said washer being seated on top of said bottom wall of said bottom piece of said multi-piece piston, said race being seated on top of said washer.

38. The pneumatic pop-up unit as claimed in claim 32 wherein said bottom wall of said bottom piece is flat.

39. The pneumatic pop-up unit as claimed in claim 37 further comprising a washer, said washer being seated on top of said bottom wall of said bottom piece of said multi-piece piston, said race being seated on top of said washer.

40. The pneumatic pop-up unit as claimed in claim 33 wherein said bottom wall of said bottom piece is shaped to include a central portion having an upwardly facing bowl-shape, said bottom wall of said race being seated on said central portion of said bottom wall of said bottom piece.

41. The pneumatic pop-up unit as claimed in claim 29 wherein said bottom wall is shaped to include a circular inverted groove, said race being seated on top of said circular inverted groove.

42. The pneumatic pop-up unit as claimed in claim 29 wherein said race is shaped to include an upwardly facing bowl and wherein said bottom wall of said bottom piece is shaped to support said race.

43. The pneumatic pop-up unit as claimed in claim 29 wherein said race is shaped to include an upwardly facing bowl, wherein said bottom wall of said bottom piece is flat and wherein said pneumatic pop-up unit further comprises a washer seated on said bottom wall of said bottom piece for supporting said race.

44. The pneumatic pop-up unit as claimed in claim 29 further comprising a washer seated on top of said circumferential flange of said top piece of said multi-piece piston.

45. The pneumatic pop-up unit as claimed in claim 29 wherein each of said top piece and said bottom piece of said multi-piece piston is made of stamped metal.

46. The pneumatic pop-up unit as claimed in claim 27 wherein said multi-piece piston further comprises a bottom piece, said bottom piece being shaped to include an open top, a circular side wall, a circumferential flange extending outwardly from the top of said circular side wall, and a bottom wall, said circumferential flange of said top piece being secured to said circumferential flange of said bottom piece.

47. The pneumatic pop-up unit as claimed in claim 46 wherein said circumferential flange of said top piece is bent around and under said circumferential flange of said bottom piece.

48. The pneumatic pop-up unit as claimed in claim 46 wherein said circumferential flange of said bottom piece is bent around and over said circumferential flange of said top piece.

49. A pneumatic pop-up unit comprising:
(a) a housing having a bottom wall, a circular side wall extending upwardly from said bottom wall, a circumferential flange extending outwardly from the top of said circular side wall, and an open top;

(b) a multi-piece piston slidable within said housing between a lower position and an upper position, said multi-piece piston comprising a top piece and a bottom piece, said top piece and said bottom piece jointly defining a piston chamber, said top piece being shaped to include a generally cylindrical side wall, a peripheral flange extending outwardly from the bottom of said generally cylindrical side wall, an open top and an open bottom, the top edges of said generally cylindrical side wall being curled inwardly, said bottom piece being shaped to include an open top, a circular upper side wall, an annular shelf extending radially inwardly a short distance from the bottom of said circular upper side wall, a circular lower side wall extending downwardly a short distance from the inner diameter of said shelf, and a bottom wall, said bottom wall being shaped to include a concave-up central portion, said circumferential flange of said top piece being seated on top of said shelf of said bottom piece;

(c) a race disposed within said piston chamber, said race being shaped to include a bottom wall having a concave-up shape and a circular side wall extending upwardly from the outer periphery of said bottom wall, said bottom wall of said race being seated on said central portion of said bottom wall of said bottom piece of said multi-piece piston;

(d) a plurality of ball bearings, said ball bearings being seated on said bottom wall of said race;

(e) an omni-directional ball seated on said ball bearings and partially extending through the open top of said top piece of said multi-piece piston, said omni-directional ball being retained within said multi-piece piston by the inwardly-curled top edges of said generally cylindrical side wall;

(f) a cap, said cap being shaped to include a top wall, an inner side wall and an outer side wall, said top wall having a central opening through which said omni-directional ball partially extends when said multi-piece piston is in said upper position, said inner side wall extending downwardly from the inner diameter of said top wall into said housing, said outer side wall extending downwardly from the outer diameter of said top wall, said outer side wall being bent around and under said circumferential flange of said housing to secure said cap to said housing;

(g) a spring, for biasing said multi-piece piston toward said lower position, said spring having a lower end and an upper end, said lower end being seated on said peripheral flange of said top piece of said multi-piece piston, said upper end abutting the lower surface of said top wall of said cap;

(h) a seal fitted around said circular lower side wall of said bottom piece of said multi-piece piston and engaging the inside surface of said circular side wall of said housing for creating an air-tight chamber between said multi-piece piston and said housing; and (i) a nipple mounted in said housing for use in admitting fluid under pressure to said housing to elevate said multi-piece piston against the bias or said spring toward said upper position.

50. The pneumatic pop-up unit as claimed in claim 49 wherein each of said housing, said cap, said top piece of said multi-piece piston and said bottom piece of said multi-piece piston is made of stamped metal.

51. The pneumatic pop-up unit as claimed in claim 49 wherein said spring is a conical spring.

52. The pneumatic pop-up unit as claimed in claim 49 wherein said omni-directional ball is positioned below said central opening in said cap when said multi-piece piston is in said lower position.

* * * * *